(12) United States Patent
Arrington et al.

(10) Patent No.: US 10,872,065 B1
(45) Date of Patent: Dec. 22, 2020

(54) SYSTEM FOR MANAGING RELATIONAL DATABASES USING XML OBJECTS

(71) Applicant: Intelligence Designs, LLC, Deatsville, AL (US)

(72) Inventors: Larry Arrington, Deatsville, AL (US); Stephen Smith, Prattville, AL (US); Paul Flomer, Wetumpka, AL (US)

(73) Assignee: Intelligence Designs, LLC, Deatsville, AL (US)

( * ) Notice: Subject to any disclaimer, the term of this patent is extended or adjusted under 35 U.S.C. 154(b) by 457 days.

(21) Appl. No.: 15/227,957

(22) Filed: Aug. 3, 2016

Related U.S. Application Data

(60) Provisional application No. 62/200,391, filed on Aug. 3, 2015.

(51) Int. Cl.
*G06F 16/21* (2019.01)
*G06F 16/22* (2019.01)
(Continued)

(52) U.S. Cl.
CPC ............ *G06F 16/211* (2019.01); *G06F 16/22* (2019.01); *G06F 16/2443* (2019.01);
(Continued)

(58) Field of Classification Search
CPC ......... G06F 17/30292; G06F 17/30312; G06F 17/30415; G06F 17/30607;
(Continued)

(56) References Cited

U.S. PATENT DOCUMENTS

| 6,243,709 B1 * | 6/2001 | Tung | G06F 9/4493 |
| | | | 707/802 |
| 6,571,232 B1 * | 5/2003 | Goldberg | G06F 16/9574 |

(Continued)

OTHER PUBLICATIONS

Microsoft, "Introducing LINQ to Relational Data", Microsoft Data Platform Development Technical Article, Jan. 2008, 18 pages (Year: 2008).*

(Continued)

*Primary Examiner* — Tony Mahmoudi
*Assistant Examiner* — Michael Le
(74) *Attorney, Agent, or Firm* — Waller Lansden Dortch & Davis, LLP; Blake M. Bernard

(57) ABSTRACT

The present invention relates to a system and methodology to facilitate the automated creation of an XML object model which overlays a standard relational database to allow both saving and retrieval of data via hierarchical XML objects from within the actual database server itself. The Automated Database Object Model (ADOM) process generates a set of log tables, triggers, stored procedures, functions, and views for all objects as determined by a database schema interrogation process. The result is a select query for every hierarchical object in the database, and a single point of entry stored procedure for all inserts, updates, and deletes. A managed application programming interface (API) is also provided to automatically generate a class object library in the application layer which matches the automated database object model, thus abstracting the application developer from directly managing the underlying database structure.

20 Claims, 16 Drawing Sheets

(51) Int. Cl.
*G06F 16/83* (2019.01)
*G06F 16/84* (2019.01)
*G06F 16/28* (2019.01)
*G06F 16/242* (2019.01)

(52) U.S. Cl.
CPC ............ *G06F 16/289* (2019.01); *G06F 16/83* (2019.01); *G06F 16/84* (2019.01)

(58) Field of Classification Search
CPC ......... G06F 17/30914; G06F 17/30923; G06F 16/211; G06F 16/2443; G06F 16/289; G06F 16/83; G06F 16/22; G06F 16/84
USPC .......................................................... 707/803
See application file for complete search history.

(56) References Cited

U.S. PATENT DOCUMENTS

| | | | | |
|---|---|---|---|---|
| 6,973,460 | B1* | 12/2005 | Mitra | G06F 8/10 |
| 2002/0049749 | A1* | 4/2002 | Helgeson | G06F 21/6236 |
| | | | | 709/203 |
| 2002/0087571 | A1* | 7/2002 | Stapel | G06F 16/258 |
| 2002/0123993 | A1* | 9/2002 | Chau | G06F 16/86 |
| 2003/0140308 | A1* | 7/2003 | Murthy | G06F 16/284 |
| | | | | 715/234 |
| 2003/0167456 | A1* | 9/2003 | Sabharwal | G06F 8/24 |
| | | | | 717/108 |
| 2004/0006563 | A1* | 1/2004 | Zwiegincew | G06F 16/835 |
| 2004/0220927 | A1* | 11/2004 | Murthy | G06F 16/86 |
| 2005/0010896 | A1* | 1/2005 | Meliksetian | G06F 16/86 |
| | | | | 717/106 |
| 2005/0050069 | A1* | 3/2005 | Vaschillo | G06F 16/284 |
| 2007/0055692 | A1* | 3/2007 | Pizzo | G06F 16/289 |
| 2007/0226196 | A1* | 9/2007 | Adya | G06F 16/24539 |
| 2008/0320441 | A1* | 12/2008 | Ahadian | G06F 8/24 |
| | | | | 717/108 |
| 2009/0138455 | A1* | 5/2009 | Copello | G06F 16/24528 |
| 2009/0193039 | A1* | 7/2009 | Bradley | G06F 16/2465 |
| 2010/0299367 | A1* | 11/2010 | Chakrabarti | G06F 16/43 |
| | | | | 707/803 |
| 2013/0060816 | A1* | 3/2013 | Hui | G06F 16/86 |
| | | | | 707/802 |
| 2015/0032689 | A1* | 1/2015 | Raghunathan | G06F 16/27 |
| | | | | 707/610 |

OTHER PUBLICATIONS

Mitchell, Scott, "Creating a Data Access Layer (C#)", Apr. 4, 2010, Microsoft Docs, 43 pages printed (Year: 2010).*

Dayen, Igor, "Storing XML in Relational Databases", Jun. 20, 2001, 23 pages printed (Year: 2001).*

ScottGu, "LINQ to SQL", Aug. 16, 2007, 48 pages printed (Year: 2007).*

Nick Lawrence et al., "Replacing DB2 XML Extender with integrated IBM DB2 for i XML capabilities," IBM Systems and Technology Group, Feb. 2013.

* cited by examiner

```
301                                          302
<Persons>                                    <Emails>
  <Person>                                     <Email>
    <PersonID>1</PersonID>                       <EmailID>1</EmailID>
    <PersonName>Bob White</PersonName>           <PersonID>1</PersonID>
    <PersonDOB>1970-01-15</PersonDOB>            <EmailAddress>test@test.com</EmailAddress>
    <RowVersionTimeStamp>2002</RowVersionTimeStamp>   <RowVersionTimeStamp>2003</RowVersionTimeStamp>
    <ModifyUser>Test.User</ModifyUser>           <ModifyUser>Test.User</ModifyUser>
    <ModifyDate>2015-04-17T16:49:00</ModifyDate>  <ModifyDate>2015-04-17T16:52:00</ModifyDate>
    <CreateDate>2015-04-17T16:48:00</CreateDate>  <CreateDate>2015-04-17T16:52:00</CreateDate>
    <CreateUser>Test.User</CreateUser>           <CreateUser>Test.User</CreateUser>
    <IgnoreIdentityInsert>0</IgnoreIdentityInsert>  <IgnoreIdentityInsert>0</IgnoreIdentityInsert>
    <ModifyTypeID>0</ModifyTypeID>               <ModifyTypeID>0</ModifyTypeID>
    <Emails>                                     <Persons>
      <Email>                                      <Person>
        <EmailID>1</EmailID>                         <PersonID>1</PersonID>
        <PersonID>1</PersonID>                       <PersonName>Bob White</PersonName>
        <EmailAddress>test@test.com</EmailAddress>   <PersonDOB>1970-01-15</PersonDOB>
        <RowVersionTimeStamp>2003</RowVersionTimeStamp>  <RowVersionTimeStamp>2002</RowVersionTimeStamp>
        <ModifyUser>Test.User</ModifyUser>           <ModifyUser>Test.User</ModifyUser>
        <ModifyDate>2015-04-17T16:52:00</ModifyDate>  <ModifyDate>2015-04-17T16:49:00</ModifyDate>
        <CreateDate>2015-04-17T16:52:00</CreateDate>  <CreateDate>2015-04-17T16:48:00</CreateDate>
        <CreateUser>Test.User</CreateUser>           <CreateUser>Test.User</CreateUser>
        <IgnoreIdentityInsert>0</IgnoreIdentityInsert>  <IgnoreIdentityInsert>0</IgnoreIdentityInsert>
        <ModifyTypeID>0</ModifyTypeID>               <ModifyTypeID>0</ModifyTypeID>
      </Email>                                     <Phones>
    </Emails>                                      <Phone>
    <Phones>                                         <PhoneID>1</PhoneID>
      <Phone>                                        <PersonID>1</PersonID>
        <PhoneID>1</PhoneID>                         <PhoneNumber>5554443333</PhoneNumber>
        <PersonID>1</PersonID>                       <RowVersionTimeStamp>2004</RowVersionTimeStamp>
        <PhoneNumber>5554443333</PhoneNumber>        <ModifyUser>Test.User</ModifyUser>
        <RowVersionTimeStamp>2004</RowVersionTimeStamp>  <ModifyDate>2015-04-17T16:52:00</ModifyDate>
        <ModifyUser>Test.User</ModifyUser>           <CreateDate>2015-04-17T16:52:00</CreateDate>
303     <ModifyDate>2015-04-17T16:52:00</ModifyDate>  <CreateUser>Test.User</CreateUser>
        <CreateDate>2015-04-17T16:52:00</CreateDate>  <IgnoreIdentityInsert>0</IgnoreIdentityInsert>
        <CreateUser>Test.User</CreateUser>           <ModifyTypeID>0</ModifyTypeID>
        <IgnoreIdentityInsert>0</IgnoreIdentityInsert>  </Phone>
        <ModifyTypeID>0</ModifyTypeID>             </Phones>
      </Phone>                                   </Person>
    </Phones>                                  </Persons>
  </Person>                                  </Email>
</Persons>                                 </Emails>
```

FIG. 5

```
ALTER PROCEDURE [dbo].[ADOM_spXmlGenericSearchPerson]
(@PersonID    int )
AS
BEGIN
SELECT
 [dbo].[Person].[PersonID] AS [PersonID]
,[dbo].[Person].[PersonName] AS [PersonName]
,[dbo].[Person].[PersonDOB] AS [PersonDOB]
,CONVERT(bigint,[dbo].[Person].[RowVersionTimeStamp]) AS [RowVersionTimeStamp]
,[dbo].[Person].[ModifyUser] AS [ModifyUser]
,[dbo].[Person].[ModifyDate] AS [ModifyDate]
,[dbo].[Person_LOG].[ModifyDate] AS [CreateDate]
,[dbo].[Person_LOG].[ModifyUser] AS [CreateUser]
,0 AS IgnoreIdentityInsert
,0 AS ModifyTypeID,
(
SELECT
 [dbo].[Email].[EmailID] AS [EmailID]
,[dbo].[Email].[PersonID] AS [PersonID]
,[dbo].[Email].[EmailAddress] AS [EmailAddress]
,CONVERT(bigint,[dbo].[Email].[RowVersionTimeStamp]) AS [RowVersionTimeStamp]
,[dbo].[Email].[ModifyUser] AS [ModifyUser]
,[dbo].[Email].[ModifyDate] AS [ModifyDate]
,[dbo].[Email_LOG].[ModifyDate] AS [CreateDate]
,[dbo].[Email_LOG].[ModifyUser] AS [CreateUser]
,0 AS IgnoreIdentityInsert
,0 AS ModifyTypeID
     FROM  [dbo].[Email]
LEFT JOIN [dbo].[Email_log] ON [dbo].[Email].[EmailID]=[dbo].[Email_log].[EmailID]
     AND [dbo].[Email_log].[ModifyTypeID]=1
WHERE
[Email].[PersonID]=[Person].[PersonID]
FOR XML PATH('Email'), ROOT('Emails'),TYPE
),
(
SELECT
 [dbo].[Phone].[PhoneID] AS [PhoneID]
,[dbo].[Phone].[PersonID] AS [PersonID]
,[dbo].[Phone].[PhoneNumber] AS [PhoneNumber]
,CONVERT(bigint,[dbo].[Phone].[RowVersionTimeStamp]) AS [RowVersionTimeStamp]
,[dbo].[Phone].[ModifyUser] AS [ModifyUser]
,[dbo].[Phone].[ModifyDate] AS [ModifyDate]
,[dbo].[Phone_LOG].[ModifyDate] AS [CreateDate]
,[dbo].[Phone_LOG].[ModifyUser] AS [CreateUser]
,0 AS IgnoreIdentityInsert
,0 AS ModifyTypeID
     FROM  [dbo].[Phone]
LEFT JOIN [dbo].[Phone_log] ON [dbo].[Phone].[PhoneID]=[dbo].[Phone_log].[PhoneID]
     AND [dbo].[Phone_log].[ModifyTypeID]=1
WHERE
[Phone].[PersonID]=[Person].[PersonID]
FOR XML PATH('Phone'), ROOT('Phones'),TYPE
)
     FROM  [dbo].[Person]
LEFT JOIN [dbo].[Person_log] ON [dbo].[Person].[PersonID]=[dbo].[Person_log].[PersonID]
     AND [dbo].[Person_log].[ModifyTypeID]=1
WHERE
[dbo].[Person].[PersonID]=@PersonID
FOR XML PATH('Person'), ROOT('Persons'),TYPE
END
```

FIG. 6

```
ALTER PROCEDURE [dbo].[Person_SearchByName]
(
        @PersonName VARCHAR(255)
)
AS
BEGIN
        SET NOCOUNT ON;
        SET @PersonName = '%' + @PersonName + '%'
--start of select section
SELECT
[dbo].[Person].[PersonID] AS [PersonID]
,[dbo].[Person].[PersonName] AS [PersonName]
,[dbo].[Person].[PersonDOB] AS [PersonDOB]
,CONVERT(bigint,[dbo].[Person].[RowVersionTimeStamp]) AS [RowVersionTimeStamp]
,[dbo].[Person].[ModifyUser] AS [ModifyUser]
,[dbo].[Person].[ModifyDate] AS [ModifyDate]
,[dbo].[Person_LOG].[ModifyDate] AS [CreateDate]
,[dbo].[Person_LOG].[ModifyUser] AS [CreateUser]
,0 AS IgnoreIdentityInsert
,0 AS ModifyTypeID,
(
SELECT
[dbo].[Email].[EmailID] AS [EmailID]
,[dbo].[Email].[PersonID] AS [PersonID]
,[dbo].[Email].[EmailAddress] AS [EmailAddress]
,CONVERT(bigint,[dbo].[Email].[RowVersionTimeStamp]) AS [RowVersionTimeStamp]
,[dbo].[Email].[ModifyUser] AS [ModifyUser]
,[dbo].[Email].[ModifyDate] AS [ModifyDate]
,0 AS IgnoreIdentityInsert
,0 AS ModifyTypeID
        FROM   [dbo].[Email]
WHERE
[Email].[PersonID]=[Person].[PersonID]
FOR XML PATH('Email'), ROOT('Emails'),TYPE
),
(
SELECT
[dbo].[Phone].[PhoneID] AS [PhoneID]
,[dbo].[Phone].[PersonID] AS [PersonID]
,[dbo].[Phone].[PhoneNumber] AS [PhoneNumber]
,CONVERT(bigint,[dbo].[Phone].[RowVersionTimeStamp]) AS [RowVersionTimeStamp]
,[dbo].[Phone].[ModifyUser] AS [ModifyUser]
,[dbo].[Phone].[ModifyDate] AS [ModifyDate]
,0 AS IgnoreIdentityInsert
,0 AS ModifyTypeID
        FROM   [dbo].[Phone]
WHERE
[Phone].[PersonID]=[Person].[PersonID]
FOR XML PATH('Phone'), ROOT('Phones'),TYPE
)
        FROM   [dbo].[Person]
LEFT JOIN [dbo].[Person_log] ON [dbo].[Person].[PersonID]=[dbo].[Person_log].[PersonID]
        AND [dbo].[Person_log].[ModifyTypeID]=1
--start of where section
WHERE
[dbo].[Person].[PersonName] LIKE @PersonName
FOR XML PATH('Person'), ROOT('Persons'),TYPE
--end of select section
END
```

501 — start of select section
502 — FROM [dbo].[Person]
503 — start of where section

```
//----------------------------------------------------------------
// <auto-generated>
//     This code was generated by a tool.
//     Runtime Version:4.0.30319.34209
//
//     Changes to this file may cause incorrect behavior and will be lost if
//     the code is regenerated.
// </auto-generated>
//----------------------------------------------------------------
namespace TestApp.Model.ADOM_Sample4Patent.dbo {
    using System;
    using System.Collections.Generic;
    using System.Xml.Serialization;
    using System.ComponentModel;
    using System.Runtime.Serialization;
    using System.ComponentModel.DataAnnotations;
    using AdomFramework;
    using AdomFramework.AdomAttributes;                          1001
    [System.Xml.Serialization.XmlRootAttribute(ElementName="Person", Namespace="ADOM_Sample4Patent.dbo")]
    public partial class Person : AdomBase, INotifyPropertyChanged {
        private int _personid;
        private string _personname;
        private System.Nullable<System.DateTime> _persondob;
        private System.Nullable<long> _rowversiontimestamp;
        private string _modifyuser;
        private System.Nullable<System.DateTime> _modifydate;
        private int _ignoreidentityinsert;
        private int _modifytypeid;
        private System.Collections.Generic.List<Model.ADOM_Sample4Patent.dbo.Email> _emails;
        private System.Collections.Generic.List<Model.ADOM_Sample4Patent.dbo.Phone> _phones;
        [System.Runtime.Serialization.DataMember(Name="PersonID")]
        [Required()]
        public virtual int PersonID {
            get {
                return this._personid;
            }
            set {
                this._personid = value;
                    OnPropertyChanged("PersonID");
            }
        }
        [System.Runtime.Serialization.DataMember(Name="PersonName")]
        [MaxLength(255)]
        public virtual string PersonName {
            get {
                return this._personname;
            }
            set {
                this._personname = value;
```

FIG. 12

```
//------------------------------------------------------------
// <auto-generated>
//     This code was generated by a tool.
//     Runtime Version:4.0.30319.34209
//
//     Changes to this file may cause incorrect behavior and will be lost if
//     the code is regenerated.
// </auto-generated>
//------------------------------------------------------------
namespace TestApp.Model.ADOM_Sample4Patent.dbo {
    using System;
    using System.Collections.Generic;
    using System.Xml.Serialization;
    using System.ComponentModel;
    using System.Runtime.Serialization;
    using System.ComponentModel.DataAnnotations;
    using AdomFramework;
    using AdomFramework.AdomAttributes;

[System.Xml.Serialization.XmlRootAttribute(ElementName="Email", Namespace="ADOM_Sample4Patent.dbo")]
    public partial class Email : AdomBase, INotifyPropertyChanged { private int _emailid;
        private System.Nullable<int> _personid;
        private string _emailaddress;
        private System.Nullable<long> _rowversiontimestamp;
        private string _modifyuser;
        private System.Nullable<System.DateTime> _modifydate;
        private int _ignoreidentityinsert;
        private int _modifytypeid;
        private System.Collections.Generic.List<Model.ADOM_Sample4Patent.dbo.Person> _persons;
        [System.Runtime.Serialization.DataMember(Name="EmailID")]
        [Required()]
        public virtual int EmailID {
            get {
                return this._emailid;
            }
            set {
                this._emailid = value;
                    OnPropertyChanged("EmailID");
            }
        }
        [System.Runtime.Serialization.DataMember(Name="PersonID")]
        public virtual System.Nullable<int> PersonID {
            get {
                return this._personid;
            }
            set {
                this._personid = value;
                    OnPropertyChanged("PersonID");
            }
        }
```

FIG. 13

```
//------------------------------------------------------------
// <auto-generated>
//     This code was generated by a tool.
//     Runtime Version:4.0.30319.34209
//
//     Changes to this file may cause incorrect behavior and will be lost if
//     the code is regenerated.
// </auto-generated>
//------------------------------------------------------------
namespace TestApp.Model.ADOM_Sample4Patent.dbo {
    using System;
    using System.Collections.Generic;
    using System.Xml.Serialization;
    using System.ComponentModel;
    using System.Runtime.Serialization;
    using System.ComponentModel.DataAnnotations;
    using AdomFramework;
    using AdomFramework.AdomAttributes;

[System.Xml.Serialization.XmlRootAttribute(ElementName="Phone", Namespace="ADOM_Sample4Patent.dbo
    public partial class Phone : AdomBase, INotifyPropertyChanged {
        private int _phoneid;
        private System.Nullable<int> _personid;
        private string _phonenumber;
        private System.Nullable<long> _rowversiontimestamp;
        private string _modifyuser;
        private System.Nullable<System.DateTime> _modifydate;
        private int _ignoreidentityinsert;
        private int _modifytypeid;
        private System.Collections.Generic.List<Model.ADOM_Sample4Patent.dbo.Person> _persons;
        [System.Runtime.Serialization.DataMember(Name="PhoneID")]
        [Required()]
        public virtual int PhoneID {
            get {
                return this._phoneid;
            }
            set {
                this._phoneid = value;
                    OnPropertyChanged("PhoneID");
            }
        }
        [System.Runtime.Serialization.DataMember(Name="PersonID")]
        public virtual System.Nullable<int> PersonID {
            get {
                return this._personid;
            }
            set { this._personid = value;

OnPropertyChanged("PersonID");

Home Concurrency Resolve Concurrency Issue

Resolve Concurrency Issue

Someone has modified this record since you loaded it. If you would like to save your changes, select "Your version" for each issue, then click the "Save Selection" button.

[🖫 Save Selections] [✕ Cancel] — 1303

Registration

Other Registration Number

● Your version — 1301
2222d

○ Server version — 1302
2222

Details

| Registration Number | O-021971 |
| Code of Service | CODE 1 |
| Pre Score Status | |
| Quote Type | Discounted |
| Registration Type | GBL |
| Self Haul Type | OA Only |
| Status | |
| Tariff | MILRS |

FIG. 15

SYSTEM FOR MANAGING RELATIONAL DATABASES USING XML OBJECTS

CROSS-REFERENCES TO RELATED APPLICATIONS

The present application is a nonprovisional patent application of U.S. patent application Ser. No. 62/200,391, filed on Aug. 3, 2015 by Larry Arrington, Stephen Smith, and Paul Flomer, and titled "ADOM Software." The present application claims priority on, and incorporates by reference in its entirety, the '391 application.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to relational databases.

More particularly, the present disclosure relates to a system and method for managing a relational database using Extensible Markup Language (XML) objects.

In the ever-changing world of software development, there continually exists a need to improve performance while increasing the level of abstraction for the application developer. With the advent of the Entity Framework and the various Model-View approaches such as Model-view-Controller (MVC), Model View View Model (MVVM), and Model-View-Presenter (MVP) there was gained a certain level of abstraction from the database server which most UI and middle-tier application developers enjoyed. The resulting Entity Manager allowed a UI developer to ingest an in-memory copy of the data structure and move forward with development without needing to know anything about SQL syntax. Instead, data in the Entity Model is manipulated by some other language such as JQuery, and then the Entity Manager handles automatic generation of the SQL syntax required to make the associated changes in the database server's relational structure. These SQL statements are then issued to the database server engine for processing, potentially sending in multiple requests for a single Model update. While this approach does manage to abstract the application developer from the database layer, it precludes the use of stored procedures which are far more performant and secure than in-line SQL statement generation and execution.

The main problem with the strict Entity Framework approach in the middle tier is one of performance. This is primarily due to the fact that the data must be loaded into the model view before much can be done with it, including searching, sorting, filtering, etc. In addition, the overhead injected into your application processes by the Entity Framework stack (FIG. 1A) can cause serious performance degradation. Database servers are designed and tuned for processing large amounts of data efficiently, while web servers and business application servers are designed for generating UI and implementing business logic. Thus, once your application's data footprint grows past a certain threshold, either the developer must take special steps to improve performance of the application, or the system administrator must continually upgrade hardware in order to keep up with the demands of the ever-increasing size and complexity of your data sets. Since we know based on a long history of experience that database servers will invariably outperform web servers when it comes to the challenge of crunching numbers, it became obvious that a new approach which moves the object model layer back inside the database server was needed. It was out of this need that the Automatic Database Object Model (ADOM) framework was developed.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The ADOM framework represents the first time that relational databases can be managed completely from an object-oriented perspective using hierarchical XML objects, all from within the database using automatically generated stored procedures, functions, views, triggers and tables. ADOM completely automates most of the development tasks within a relational database. This allows the Database Administrator (DBA) to create or modify table schema designs and foreign key relationships either directly through SQL scripting techniques, or by using one of many Graphical User Interface (GUI) tools such as SQL Management Studio's Database Diagram Visual Database Tool (VDT). Once all table schema changes have been implemented in the target database, the ADOM framework interrogates the database schema to determine the resulting hierarchical object structure based on Foreign Key (FK) relationships between the tables. The ADOM framework has the ability to allow the DBA to define FK's to data in external catalogs and across Linked Servers. The ADOM framework also implements a completely automated detailed logging structure which is utilized throughout the processing life-cycle. ADOM automatically generates new log tables as needed and/or modifies existing log tables to conform to database schema changes, then ADOM creates or modifies the automated Triggers which handle populating the log tables. The automated triggers insert detailed transaction records in the log table which audits all changes for every primary object in the data structure.

Once the log tables and triggers have been generated, the ADOM process then creates a special set of object "attribute select" stored procedures which return the fully-qualified hierarchical XML object structure for all objects in the relational database as determined by the database schema interrogation process. These special "attribute" select statements include additional metadata about each element within the object. This information is then used by the ADOM custom class builder API to automatically generate a class object library in the application layer which matches the automated database object model, thus abstracting the application developer from directly managing the underlying database structure. The resulting class objects can then be loaded directly from the ADOM auto-generated select stored procedures for use with any number of object-oriented development techniques. The resulting ADOM-generated class objects are built as partial classes in order to maximize extendibility and customization, while ensuring that the developer does not lose any custom changes the next time the ADOM class builder is run.

Next the ADOM process generates "Generic Search" stored procedures to return fully-qualified hierarchical XML objects for each table object in the database, as identified by the schema interrogation process. The resulting XML objects each contain all related objects as determined by the database schema's FK definitions. Thus, the developer can select the objects from multiple different perspectives, which are each valid in most cases, allowing for a maximum level of flexibility in the application development process. The DBA can then take the resulting query logic from the "Generic Search" stored procedures and use it to generate custom search stored procedures as needed to suit the external application's requirements. By implementing a special set of code "Tags" within the custom search stored procedure's syntax, the DBA can enable ADOM to automatically manage the updates of the custom search stored procedure logic whenever there are changes made to the database schema. This means that when the DBA adds a new column to a table, removes a column from a table, adds a new related table, or removes an existing related table, the ADOM process will update the custom search stored procedures with the schema changes and return the proper hierarchical XML object.

All modifications to the data are then pushed back to the database as the updated XML object to a single controller stored procedure which handles inserts, updates, and deletes to the underlying relational tables. ADOM can handle the entire object at once, or any part of the object as long as the required data elements are present within each node level. This means that the developer only needs to manage the data at the object level, and the ADOM framework elegantly handles both the initial generation of the objects and their contents from the database, as well as the persistence of the changes to those objects back into the relational database layer.

Numerous other objects, advantages and features of the present disclosure will be readily apparent to those of skill in the art upon a review of the following drawings and description of a preferred embodiment.

BRIEF DESCRIPTION OF THE DRAWINGS

FIG. 5 is a printout showing nested phone and emails records generated by one embodiment of the present invention.

FIG. 6 is a printout showing a stored procedure used in one embodiment of the present invention.

FIG. 7 is a printout showing another stored procedure used in one embodiment of the present invention.

FIG. 8 is a printout showing the output from a stored procedure used in one embodiment of the present invention.

FIGS. 12, 13, and 14 are printouts showing partial sample class structures used in one embodiment of the present invention.

FIG. 15 is a screenshot showing a concurrency form user interface used with one embodiment of the present invention.

DETAILED DESCRIPTION OF THE INVENTION

Figure 1B:
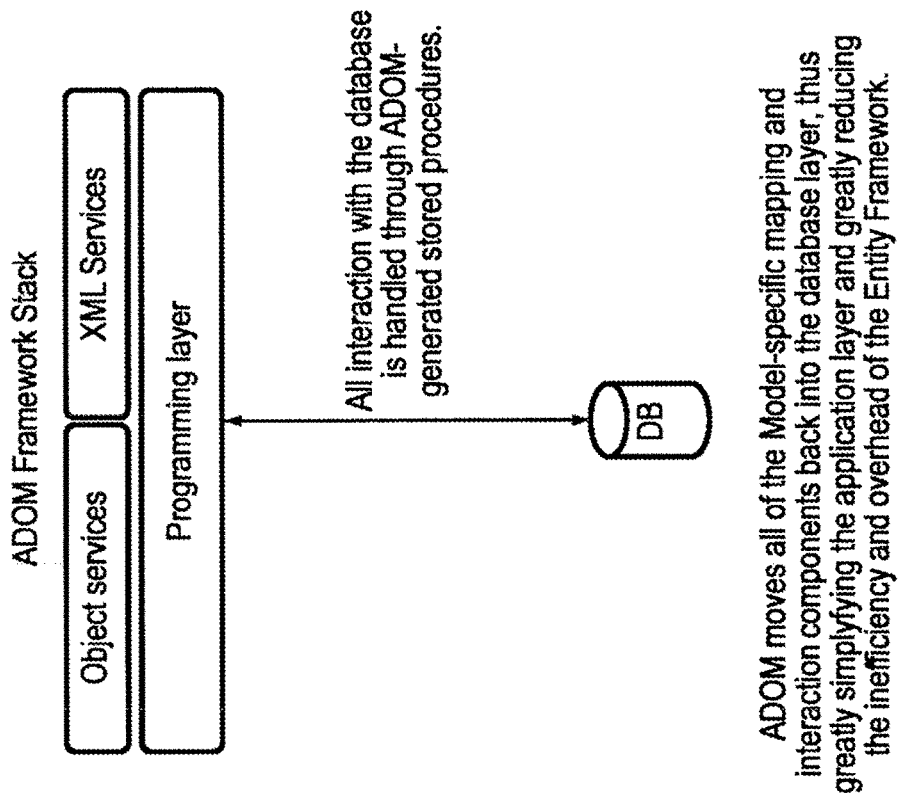
FIG. 1A and FIG. 1B are block diagrams comparing one embodiment of the ADOM Framework of the present invention (FIG. 1B) with a prior art Entity Framework (FIG. 1A).
Figure 1A:
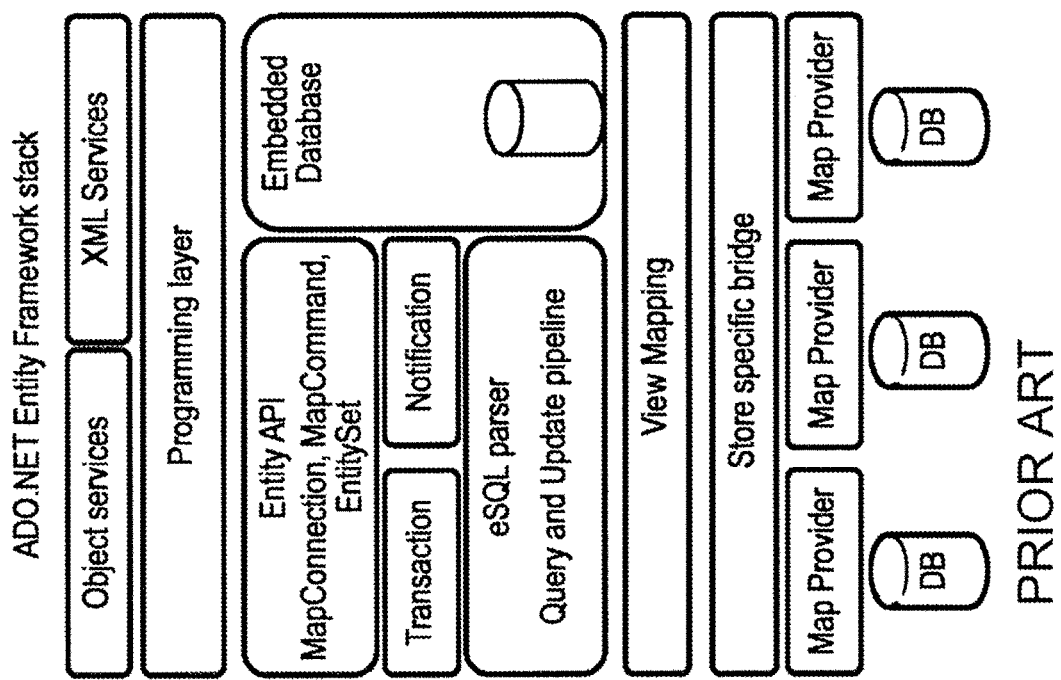
Figures 2A, 2B:
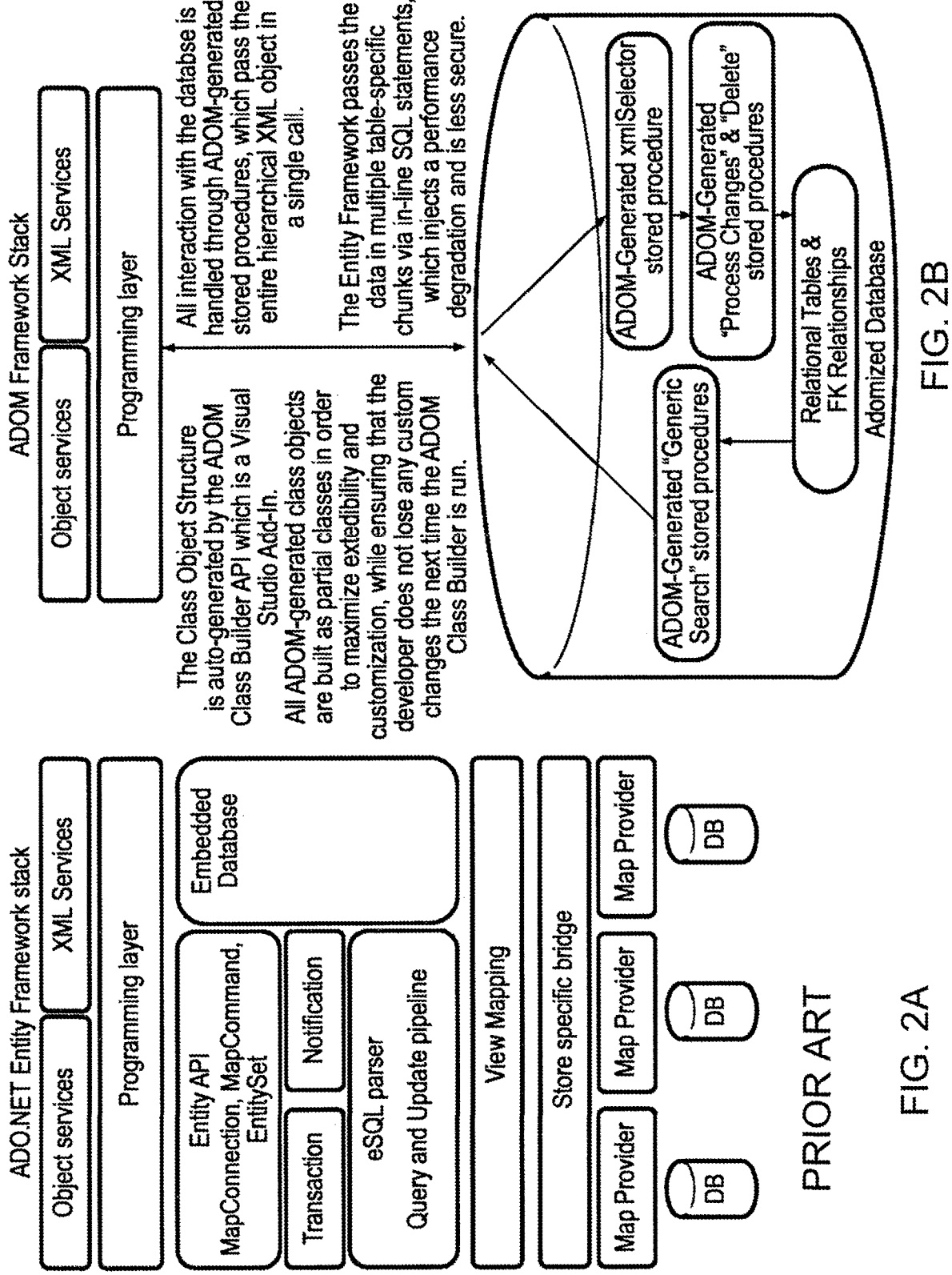
FIG. 2A and FIG. 2B are second block diagrams comparing another embodiment of the ADOM Framework of the present invention (FIG. 2B) with a prior art Entity Framework (FIG. 2A).

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

ADOM Framework

The ADOM Framework consists of a set of SQL scripts all contained within a single managed database structure. When the contained scripts are executed against a specified database catalog, they automatically generate everything needed to implement the managed XML object model for the given data structure. This allows the DBA to focus on generating a solid base relational database structure, and then ADOM handles everything else. The result is a fully functional XML object model that lives inside the target database. Below we will detail the components of the ADOM Framework, and then how they are applied to a relational database to produce the XML Object model.

ADOM Stored Procedures

Below are a list of stored procedures contained within the ADOM database and a brief description of the processes that each procedure performs.

DatabaseUpdateController

The DatabaseUpdateController is the primary point of entry for applying the ADOM framework to a specific database catalog. As the name suggests, this SQL procedure is the controller for implementing the other stored procedures and SQL scripts required to implement the ADOM framework.

Parameters:

@db VARCHAR(MAX)=The name of the target database catalog to which the ADOM framework is to be applied.

@DropExistingScripts BIT=Indicates whether previously generated ADOM scripts should be deleted.

Process Steps:

The first thing the DatabaseUpdateController does is determine if the ADOM framework has previously been applied to the target database catalog. If it is the first time the ADOM framework has been applied to the target database catalog, then the DatabaseUpdateController executes the DatabaseFirstRun stored procedure. If the ADOM framework has previously been applied, then the following steps are performed:

If @DropExistingScripts=True, then Exec Adorn Function. DropExistingAdom Procs.
    Exec AdomFunction.LogTableSchemaUpdate
    Exec AdomFunction.LogTableTriggerUpdate
    Exec AdomFunction.CreateProcs
    Exec AdomFunction.CreateLookUpTableStructure
    Exec AdomFunction.CreateSelector
    Exec AdomFunction.CreateSelector_Trans
    Exec AdomFunction.UpdateMainSearch
    Exec AdomFunction.ConcurrencyForm DatabaseFirstRun The DatabaseFirstRun procedure controls the creation and population of a set of special ADOM tables used to set ADOM-specific configuration settings in the database.

Parameters

@db varchar(max)=Name of the database catalog to which the ADOM framework is to be applied Process Steps
    Exec AdomFunction.CreateRequiredTables
    Exec AdomFunction.ForeignKeyInsert
    Exec AdomFunction.TableListInsert ExecControllerADOM The ExecControllerADOM procedure interrogates each database catalog on a given server to determine if it is an ADOM-controlled database catalog and then executes the DatabaseUpdateController procedure for each. This is only used when the user wants to perform a mass update on ALL ADOM-controlled databases on a given server.

spAddTableColumn

The spAddTableColumn procedure is a programmatic way to add a new column to a given table.

Parameters

@TableName VARCHAR(255)=The name of the target table

@ColumnName VARCHAR(255)=The name of the new column to be added

@DataType VARCHAR(255)=The data type of the new column to be added

Process Steps

Checks to see if the column already exists in the target table

If Not exists, then performs an ALTER TABLE statement and adds the column.

ADOM Functions

The following is a list of special ADOM user-defined functions contained within the ADOM database and a brief description of the processes that each function performs.

fnStringToTable

The fnStringToTable table-valued function splits a given string by a given separator string, and then returns the split components as a table for processing.

Parameters

@inputString NVARCHAR(MAX)=The string to be split

@separator VARCHAR(10)=The string to use as the split point

Process Steps

Splits the @inputString value based on the @separator parameter and returns split strings in table format.

fnCreateAlterProc

Parameters

@ProcName VARCHAR(500)=The name of the stored procedure to be created or altered.

Process Steps

Checks to see if the stored procedure already exists with the @ProcName value.

If Exists
Returns ALTER PROCEDURE
Else
Returns CREATE PROCEDURE

SpaceBeforeCap

The SpaceBeforeCap user-defined function inserts a space before every capitalized letter in a given input string. This is used to make database object names more legible for a human. (i.e.—"SpaceBeforeCap" would be changed to "Space Before Cap")

Parameters

@str NVARCHAR(MAX)=The string to which the function is applied.

Process Steps

Inserts a space before all capitalized letters in a string

ADOM Tables

Below is a list of tables contained within the ADOM database and a brief description of the contents and purpose of each table.

Adorn Function

The AdomFunction table contains a set of SQL scripts which are the primary tools used to implement the ADOM framework in a specified database catalog. These scripts are loaded into a temporary table at the beginning of the Adomization process, so that they can be referenced from any point within the process. Some of the scripts are called multiple times from various places.

CreateRequiredTables—This script creates a set of special ADOM-specific configuration tables in the target database catalog.

Create Table ADOM_DatabaseList and Populate
    Create Table ADOM_MainQuery
    Create Table ADOM_ConcurrencyIssue
    Create Table ADOM_ForeignKey
    Create View vwForeignKey
    Create Table ADOM_NeverDuplicate
    Create Table ADOM_Configuration
    Create Table ADOM_ConcurrencyFormControlType and Populate
    Create Table ADOM_ConcurrencyFormControl
    Create FK Constraint between ADOM_ConcurrencyFormControlType and ADOM_ConcurrencyForm Control tables
    Create Table ADOM_ModifyType and populate LogTableSchemaUpdate—This script creates or updates the ADOM-generated Log tables to reflect any changes in the Primary parent tables. All ADOM-generated Log tables are created to conform to XML Guidelines.

Interrogates database schema structure to determine if any changes have been made in the Primary table structure Updates related Log table structure to match primary table structure LogTableTriggerUpdate—This script updates the ADOM-generated triggers on all primary tables to populate the ADOM-generated Log tables.

Create or Update Log Table Trigger syntax based on primary table structure

Interrogates schema structure of Primary tables and Log tables
Deletes existing LogTable triggers
Creates new LogTable Triggers
UpdateMainSearch—This script updates custom queries to ensure the XML object structure matches the current relational database structure.
Gets a list of custom queries that need to be updated by ADOM from the ADOM_MainQuery table.
Loops through list and updates custom query's select syntax with latest version of generic search syntax based on special tags.
CreateAttributesSelect—This script generates a special set of "Attribute Select" stored procedures for each primary object in the database which return fully-populated samples of each hierarchical XML object. The resulting object also includes special attributes which are used by the ADOM class builder
API to construct the middle-tier class objects.
Gets the ProcPrefix value from the ADOM_Configuration table
Checks the ADOM_TableList.GenerateAttribute value
If GenerateAttribute=1
Builds the XML Object structure based on FK relationships
Populates each column with the values in the ADOM.dbo.DefaultValue table for each data type.
Creates the ADOM_AttributeSelect stored procedure for the given table.
CreateDeleteProcs—This script generates a "Delete" stored procedure for a given table in the database.
Creates or Updates the Delete stored procedure for a given Table
CreateGenericSearch—This script creates a base "Generic Search" stored procedure for a given Primary table object in the database, which returns the hierarchical XML object based on a primary key.
Gets the ProcPrefix value from the ADOM_Configuration table
Ensures that the @TableName parameter value is cased the same as the Table name in the database.
Sets the CREATE/ALTER statement based on whether the stored procedure already exists.
Sets the ROOT node in the XML object based on the @TableName parameter.
Sets the PK of the root object based on the ADOM_TableList data
Sets the ROOT PK data type based on schema interrogation
Iterates through the ADOM_TableList data to set the tables to be included in the Object.
Populates the XML object nodes for each node-level based on schema interrogation of columns in each table.
Adds any non-primary lookup table columns to the referenced node level.
Creates the Generic Search stored procedure.
CreateProcs—This script generates the Insert/Update/Delete stored procedure logic structure for each primary table object in the database.
Gets ProcPrefix from the ADOM_Configuration table
Interrogates the ADOM_TableList data
Loops through table list and does the following:
Exec AdomFunction.CreateTableStructure
Strings together syntax for join statements on FK's
Strings together syntax to update non primary keys
Create/Update Process Changes sproc
Exec spXmlCreateDeleteProcs CreateProcsGUID—This script creates the Process Changes stored procedure for a given table which has a GUID as its primary key.
Sets the sproc name as follows: @ProcName=@ProcPrefix+'spXmlProcess'+@TableName+'Changes'
Gets the ModifyUserColumn and ModifyDateColumn values from the ADOM_TableList configuration table
Checks the ADOM_ForeignKey table to see if the GUID PK is used as a FK anywhere in the database
Checks to see if the given table is configured for Concurrency Checking
Sets the UPDATE statement based on columns in Table
Sets the INSERT statement based on columns in Table
Checks the ADOM_NeverDuplicate table for columns which must contain unique values, and adds the syntax to check this to the query logic
If the table is configured for concurrency checking, then the syntax for this is added to the query logic
CREATE/ALTER PROCEDURE statement is executed
CreateProcsIdentity—This script creates the Process Changes stored procedure for a given table which has an Identity column as its primary key.
Creates the Insert/Update procedure for a given table which has an Identity column as the Primary Key
Sets the sproc name as follows: @ProcName=@ProcPrefix+'spXmlProcess'+@TableName+'Changes'
Gets the ModifyUserColumn and ModifyDateColumn values from the ADOM_TableList configuration table
Checks the ADOM_ForeignKey table to see if the GUID PK is used as a FK anywhere in the database
Checks to see if the given table is configured for Concurrency Checking
Sets the UPDATE statement based on columns in Table
Sets the INSERT statement based on columns in Table
Checks the ADOM_NeverDuplicate table for columns which must contain unique values, and adds the syntax to check this to the query logic
If the table is configured for concurrency checking, then the syntax for this is added to the query logic
CREATE/ALTER PROCEDURE statement is executed
CreateProcsNoIdentity—This script creates the Process Changes stored procedure for a given table which has something other than a GUID or an identity column as its primary key.
Creates the Insert/Update procedure for a given table which has something other than a GUID or Identity as the Primary Key
Sets the sproc name as follows: @ProcName=@ProcPrefix+'spXmlProcess'+@TableName+'Changes'
Gets the ModifyUserColumn and ModifyDateColumn values from the ADOM_TableList configuration table
Checks the ADOM_ForeignKey table to see if the GUID PK is used as a FK anywhere in the database
Checks to see if the given table is configured for Concurrency Checking
Sets the UPDATE statement based on columns in Table
Sets the INSERT statement based on columns in Table
Checks the ADOM_NeverDuplicate table for columns which must contain unique values, and adds the syntax to check this to the query logic
If the table is configured for concurrency checking, then the syntax for this is added to the query logic
CREATE/ALTER PROCEDURE statement is executed CreateSelector—This script creates the xmlSelector stored procedure which is the non-Transactional controller for all Inserts/Updates/Deletes Sets the ProcPrefix value based on the ConfigurationValue in the ADOM_Configuration table Sets the CREATE/ALTER PROCEDURE statement based on whether the procedure already exists in the database Strings together the query logic based on the objects defined in the ADOM_TableList table Adds the syntax to extract the ModifyUser value from the root node in the XML Object Adds the logic to call the Process Changes and Delete sprocs for all objects in the database CREATE/ALTER PROCEDURE statement is executed CreateSelector_Trans—This script creates the xmlSelector stored procedure which is the Transactional controller for all Inserts/Updates/Deletes Creates the xmlSelector Trans stored procedure which is the Transactional controller for all Inserts/Updates/Deletes Sets the ProcPrefix value based on the ConfigurationValue in the ADOM_Configuration table Sets the CREATE/ALTER PROCEDURE statement based on whether the procedure already exists in the database Strings together the query logic based on the objects defined in the ADOM_TableList table Adds the syntax to extract the ModifyUser value from the root node in the XML Object Adds the logic to call the Process Changes and Delete sprocs for all objects in the database CREATE/ALTER PROCEDURE statement is executed CreateTableStructure—This script Interrogates the ADOM_TableList and database schema to generate the XML object structure and join logic for XML Queries of a given table Ensures that the @CreateTableStructureTableName value is cased the same as Table Name in the database Loops through the ADOM_TableList and ADOM_ForeignKey tables to determine related tables to build the hierarchical XML object tree structure Adds the syntax to return the columns for each object node level as well as any lookup table values for non-primary tables Adds the JOIN syntax to link the object tree together Exec Adorn Function. CreateGenericSearch Exec AdomFunction.CreateAttributesSelect TableListinsert—This script populates the ADOM_TableList table data Create ADOM_TableList Table if it does not already exist Interrogate Data Schema Structure Inserts/Updates data into ADOM_TableList Table based on schema interrogation Deletes rows for any tables which no longer exist in the data structure Sets the row for the ADOM_ConcurrencyFormControl table as a Primary table ForeignKeyInsert—This script populates the ADOM_ForeignKey table Inserts the database catalog name into the ADOM_DatabaseList table Interrogate ADOM_TableList and FK Schema definitions Insert into ADOM_ForeignKey table CreateLookUpTableStructure—Creates the XML Object structure for a given non-primary lookup table, and then calls the create functions Interrogate schema structure and generate the XML Object structure for the given non-primary lookup table Exec AdomFunction.CreateGenericSearch Exec AdomFunction.CreateAttributesSelect Exec AdomFunction.CreateLookupSelect CreateLookupSelect—This script creates the XML object select stored procedure for a given non-primary lookup table Sets ProcPrefix based on ConfigurationValue in ADOM_Configuration table Sets the CREATE/ALTER PROCEDURE syntax If ADOM_TableList.GenerateSelectAllLookup=1

Create an XML Select statement to return ALL rows in table

DropExistingAdomProcs—This script deletes all pre-existing ADOM generated stored procedures, user-defined functions, views, and triggers Drops existing ADOM generated Procs, functions, views and triggers ConcurrencyForm—This script populates the ADOM_ConcurrencyFormControl table based on schema interrogation Interrogates database schema to determine tables to check for concurrency Populates the ADOM_ConcurrencyFormControl table based on schema interrogation and data from ADOM_TableList table UpdateMainSearchLoop—This script updates any custom search stored procedures with the latest XML object structure created in the Generic Search stored procedures Loops through the ADOM_MainQuery table data updates custom search logic with the latest Generic Search logic for the given XML Object based on special tags DefaultValue The DefaultValue table contains a list of all available data types and their associated default values, which are used by the Attribute Select stored procedures.

DATA_TYPE=The data type for the given record

DefaultValue=The default value for the given data type

ProcsFunctionstoCopy

The ProcsFunctionstoCopy table contains a list of special functions and procedures to copy to ALL ADOM-controlled databases.

ProcsFunctionstoCopyID INT=Primary Key for the ProcsFunctionstoCopy table

Type CHAR=Indicates whether the object is a user-defined function (F) or a stored procedure (P)

Name VARCHAR(255)=The name of the object to copy

Ground Rules for Database Design

As previously mentioned, the ADOM process interrogates the relational database structure in order to determine the XML object structures. Thus, the structure of the database will determine the structure of the resulting hierarchical XML objects. With this in mind, there are certain ground rules and best practices which should be adhered to in order to produce the most optimal ADOM-generated XML and class object structures, as well as how those structures are manipulated and available to the consuming application. Below are some of the primary rules to consider when building a data structure which you intend to Adomize.

All ADOM controlled database objects must have XML compliant names (i.e. —Table name and column names should not contain spaces, slashes, etc.)

All related tables should have Foreign Key Relationships defined.

All ADOM controlled object tables must have Primary Key columns defined.

You should limit the use of circular referencing Tables/Columns. Although ADOM can handle circular references, your resulting object structure can become less efficient.

Binary objects (i.e. —Images, Documents, etc. . . . ) should not be stored in primary object tables along with the metadata for the record. This will greatly increase the overall size of your objects.

Sample Database

Figure 3:
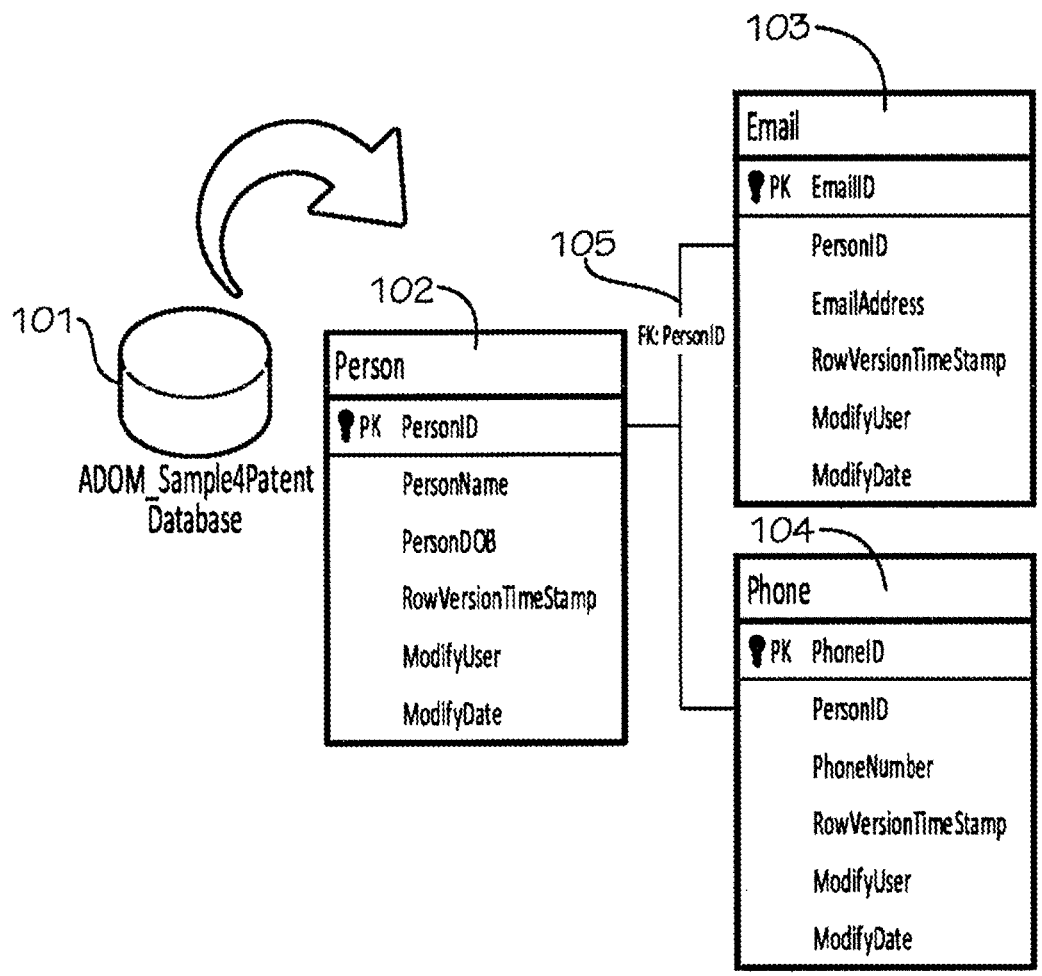
FIG. 3 is a block diagram showing a sample database including three tables used with one embodiment of the present invention.

For the purposes of this patent submission we have included a sample Adomized SQL database named ADOM_Sample4Patent (101). This simplified database only contained the following three tables and their foreign key relationships as identified in FIG. 3 prior to running the ADOM process.

102—Person
103—Email
104—Phone

The Person table (102) is shown to be related to the Email (103) and the Phone (104) tables via Foreign Key relationships (105) using the Person tables PK of PersonID. Thus, in this example the Person table would be the parent and the Email and Phone tables would be considered to be children. It is this Parent/Child relationship which is crucial throughout the entire set of ADOM processes. This relationship not only determines the XML object structure, but also the processing order on saves to ensure that FK values are present at the point of inserting any child records. We will reference these tables and concepts extensively throughout the remainder of this document.

Special ADOM Tables

The following is a list of special tables automatically generated and used by the ADOM process:

ADOM_DatabaseList—Holds a list of database catalog names referenced . . . .

ADOM_TableList—Holds a list of Tables in the database as well as other configurable data used by the ADOM process.

ADOM_ForeignKey—Holds a configurable list of FK definitions in the database . . . .

ADOM_NeverDuplicate—Holds a list of Table/Column combinations which should contain unique values. This list will be used by the ADOM insert/update process to ensure uniqueness prior to update.

ADOM_DefaultValue—Holds a list of default values for each data type to be used by the "Attribute Select" statements which will be described later in this document.

ADOM_MainQueries—Holds a list of custom queries which will be updated when the ADOM process is run.

ADOM_ConcurrencyIssue—Holds information about any concurrency issues found while attempting to save changes . . . .

ADOM_ConcurrencyFormControl—Holds information related to Tables/Columns which have been configured for concurrency checking. This data is used to automate the concurrency form controls in the UI. This topic will be described in detail later in this document . . . .

ADOM_ConcurrencyFormControlType—Holds a list of UI control types to be used in the ADOM_ConcurrencyFormControl table.

ADOM_ModifyType—Holds the modify type data used by the ADOM process . . . .

The first time the ADOM process is ran against a database the above tables will be created and populated based on an interrogation of the system object tables with default configuration values. All subsequent runs of the ADOM process will merely update these tables in order to maintain configuration setting changes over time. The two most important tables in the ADOM framework and their primary contents are listed below. These tables are used during the ADOM processing to determine everything from the XML object structures to the middle-tier class object libraries, and how changes are processed during saves.

ADOM_TableList:

SchemaName—This is the name of the schema to which the referenced table belongs . . . .

TableName—The name of the table being referenced . . . .

PrimaryTable—This bit field indicates whether the table is a primary object table . . . .

PrimaryKey—Name of the PK field for the table being referenced . . . .

IgnoreTable—This bit field tells the ADOM process to ignore the table in the primary XML object structure. Default Value=FALSE ModifyUserColumn—This is the column name in the referenced table which holds the modify user value, if any . . . . This field is handled in a special way by the ADOM framework . . . .

ModifyDateColumn—This is the column name in the referenced table which holds the modify date value, if any . . . . This field is handled in a special way by the ADOM framework . . . .

CreateUserColumn—This is the column name in the referenced table which holds the create user value, if any . . . . This field is handled in a special way by the ADOM framework . . . .

CreateDateColumn—This is the column name in the referenced table which holds the create date value, if any . . . . This field is handled in a special way by the ADOM framework . . . .

ADOM_ForeignKey: We will use the Person ID FK (105) in FIG. 3 which relates the Person table (102) to the Email table (103) as an example for the description of each below.

PrimaryDatabaseName—This is the name of the Database Catalog in which the primary table being referenced by the FK definition exists.

PrimarySchemaName—This is the schema name to which the Primary Table belongs.

Primary Table—The name of the table in which the FK exists . . . . This would be the Person table (102) in FIG. FIG. 3.

PrimaryColumn—The name of the column in the primary table as identified by the FK definition . . . . This would be the "PersonID" column in the Person table (102) in FIG. FIG. 3.

ForeignKeyDatabaseName—This is the name of the Database Catalog in which the foreign key table being referenced by the FK definition exists. (ADOM_Sample4Patent in our example)

ForeignKeySchemaName—This is the schema name to which the Foreign Key Table belongs. (dbo in our example)

ForeignKeyTable—This is the table being related by the FK definition . . . . This would be the Email table (103) in FIG. 3.

ForeignKeyColumn—This is the PK column of the table being related as identified by the FK definition . . . . This would be the "PersonID" column in the Email table (103) in FIG. 3.

LinkedServer—This is the name of any Linked Server object required to relate the Primary and Foreign Key tables together. This is ONLY required for external FK references to catalogs on different servers.

IgnoreForeignKey—This bit field tells the ADOM process to ignore the FK relationship when creating the XML Object structure.

Log Tables

Figure 4:
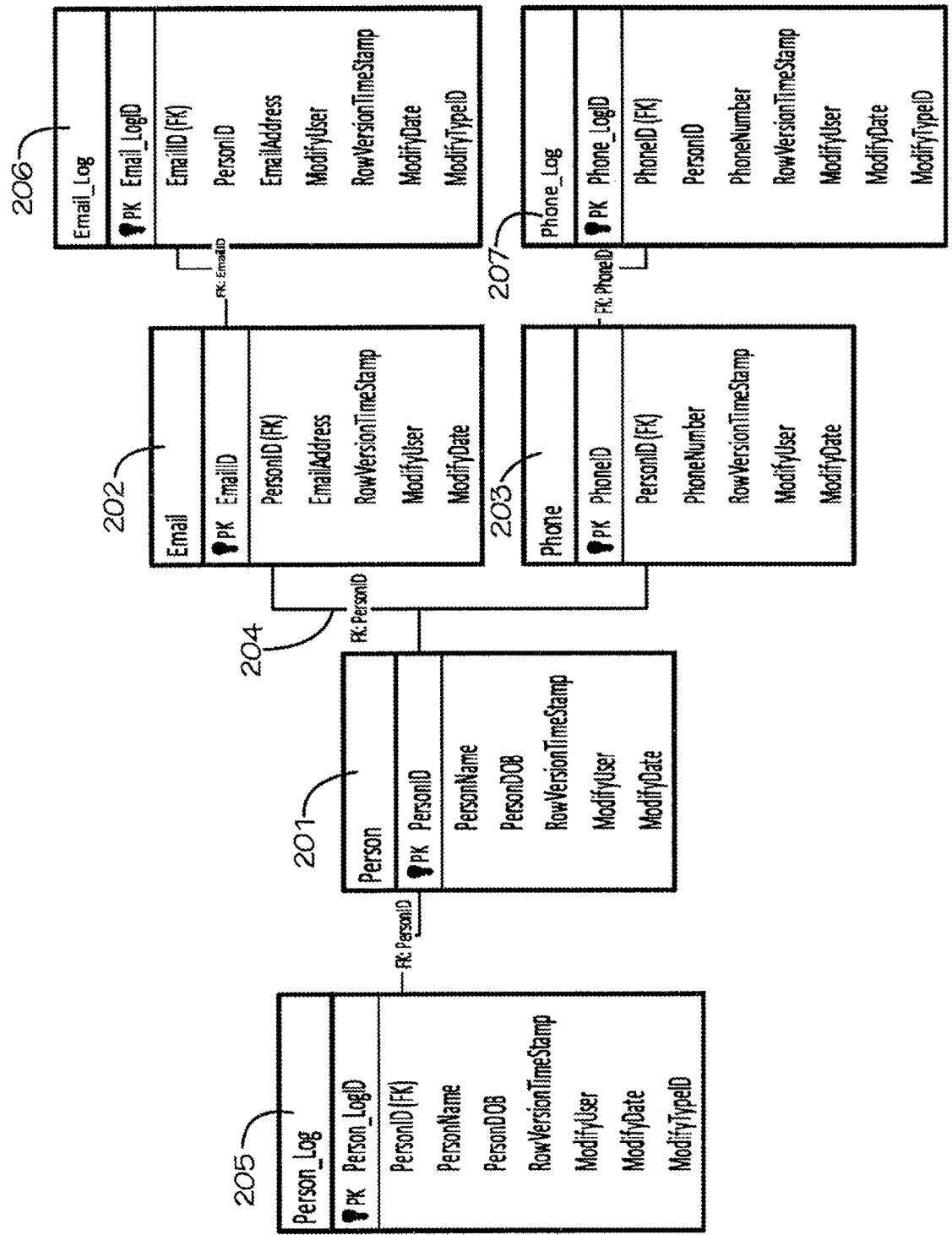
FIG. 4 is a block diagram showing log tables generated by one embodiment the present invention.

Once the above tables have been created and populated by the ADOM process, then Log tables are automatically generated for each table in the ADOM_TableList table where the PrimaryTable column equals TRUE. In FIG. 4 we have expanded the table list from FIG. 3 to include the auto-generated Log tables. In our example, the ADOM_TableList.PrimaryTable value would have been set to "True" for all three of the pre-existing tables, resulting in the new auto-generated tables Person_Log" (205), "Email_Log" (206), and Phone_Log (207). You will notice that the structures of these tables are direct copies of their parent Primary Object tables, with the addition of the following two new columns:

[ParentTableName]_LogID—This is the primary key for the Log table.

ModifyTypeID—This is a FK to the ADOM_ModifyType table which has the following values:

1=Insert
2=Update
3=Delete

Once the ADOM generated Log tables have been created, the ADOM process generates triggers to populate the Log table with the changes that occur in the Primary table. On any subsequent run of the ADOM process against the database, the process will automatically update the Log tables and Triggers to reflect any changes in the database structure.

XML Object Structure

The next step in the ADOM process is to determine the hierarchical object structure of the relational database tables. This process combines data from both the ADOM_TableList and ADOM_ForeignKey tables. ADOM iterates through the tables in the ADOM_TableList data where PrimaryTable=TRUE and IgnoreTable=FALSE. For each primary table found, another process is spawned which then starts walking the chain of related tables based on the FK definitions contained in the ADOM_ForeignKey table where IgnoreForeignKey=FALSE. For each new relationship found, a "Path" value is created starting with the original Primary Table as the "Root" node. In our ADOM_Sample4Patent database, the resulting Path values would be as follows:

Person
Person/Email
Person/Phone
Email
Email/Person
Email/Person/Phone
Phone
Phone/Person
Phone/Person/Email Once the process has walked the relationship tree as far as it can in every direction, for a given Primary Table, then the generated Path values are evaluated and reduced down to only contain those with maximum distinct values. So, this would reduce the above list down to the following Paths:

Person/Email
Person/Phone
Email/Person/Phone
Phone/Person/Email

Then this information is used to generate a hierarchical XML object structure by iterating through each table in the Path list and gathering any column and attribute data required to construct the Generic Search and Attribute Select stored procedures. In our simplified example, the 4 paths above will result in only 3 root object perspectives:

Person
Email
Phone

The resulting XML object structures for each of these can best be seen in our ADOM_Sample4Patent database by executing the following stored procedures:

ADOM_AttributeSelectPerson
ADOM_AttributeSelectEmail
ADOM_AttributeSelectPhone

Generic Search Stored Procedures

At this point, ADOM uses custom syntax to generate an XML object select stored procedure and save it in the database under the "ADOM_spXmlGenericSearch[TableName]" naming convention. This stored procedure will select the hierarchical XML object based on the PK parameter of the root primary object. In our example, this process would result in the following three stored procedures, which can be seen in the attached ADOM_Sample4Patent database:

ADOM_spXmlGenericSearchPerson @PersonID (400)—This would return a hierarchical "Person" object with all associated Email and Phone records.

ADOM_spXmlGenericSearchEmail @EmailID—This would return a hierarchical "Email" object with the associated Person and all Phone records.

ADOM_spXmlGenericSearchPhone @PhoneID—This would return a hierarchical "Phone" object with the associated Person and all Email records.

The above mentioned stored procedures will give you a default way to select data in your database from the perspective of any Primary object table. In our example, you could pull the data for the Person XML object and get all of their nested Email and/or Phone records (301), or you could pull the data for a Phone or Email and get the person as a nested child record in the XML (302). This allows for a maximum level of flexibility in how you can view and manage data from an Adomized database.

Custom Search Stored Procedures

The "Generic Search" approach above is great for working with data when you know the PK of the root object, but what about when you don't know the PK of the record with which you are wanting to work? The ADOM framework has a way to allow the developer to create custom search stored procedures which will be automatically updated every time the ADOM process is run. All the developer has to do is copy the select logic from the generic search for the object type for which he is wanting to search, and paste that logic into a new stored procedure (500). Then the developer simply adds a few special comment tags (501, 502, & 503) to the new SQL select query, and adds a single entry to the ADOM_MainQueries table as follows:

BaseSelect=The name of the ADOM Generic Search stored procedure from which you copied the original select logic. This is the ADOM_spXmlGenericSearchPerson (400) sproc in our example.

MainQuery=The name of the custom search sproc which you wish to be auto-maintained by ADOM. This is the Person_SearchByName (500) sproc in our example.

Attributes Select

ADOM also creates a special stored procedure for each primary object which returns a fully-formed hierarchical XML object representing every potential node in the object structure populated with sample data and special attributes for each node. The sample data in the attribute select stored procedures is populated based on the values for each data type contained in the ADOM_DefaultValue table. The resulting attribute select stored procedures are used by the ADOM Class Generator API process which will be described later in this document. FIG. 8 is the output for the ADOM_spXmlAttributesSelectPerson stored procedure included in the ADOM_Sample4Patent database accompanying this submission. The attributes returned are listed below:

DatabaseName (601): The database catalog to which the Source Table belongs

SchemaName (602): The database schema to which the Source Table belongs

Type (603): Data Type

DataTypeLength (604): The maximum length for a character-based data type

IsNullable (605): Whether the element is nullable

SourceTable (606): The Source Table for the element

IsForeignKey (607): Whether the field is a Foreign Key to another table

LinkedServer (not listed): The linked server name (if required) to which the FK catalog ForeignKeyDatabase (608): The database catalog to which the Foreign Key Table belongs ForeignKeySchema (609): The database schema to which the Foreign Key Table belongs ForeignKeyTable (not visible): Table to which the Foreign Key relates ForeignKeyColumn (not visible): The related key field in the Foreign Key table Class Builder API The ADOM framework also includes a custom Class Builder API that can automatically generate a Microsoft. NET class library structure which matches the ADOM-generated XML object structure in the database. This allows the XML objects retrieved from the database to be directly de-serialized into .NET manageable objects.

The Class Builder API utilizes the XML output that is returned from the ADOM generated "Attribute Select" stored procedures as seen in FIG. 8. The XML output returned from these stored procedures contains attributes which the Class Builder API uses to define the class objects, such as the namespace (1001), which is a combination of the DatabaseName (601) and SchemaName (602) attributes, and object relationships.

Additionally, the Class Builder API appends .NET Data Attributes to the generated fields that correspond with the supplied attributes in the XML attribute select stored procedure. For example, the DataTypeLength (604) and IsNullable (605) attributes translate to data validation attributes (1002 & 1003) in the .NET class that can then be used downstream in a client application.

Figure 16:
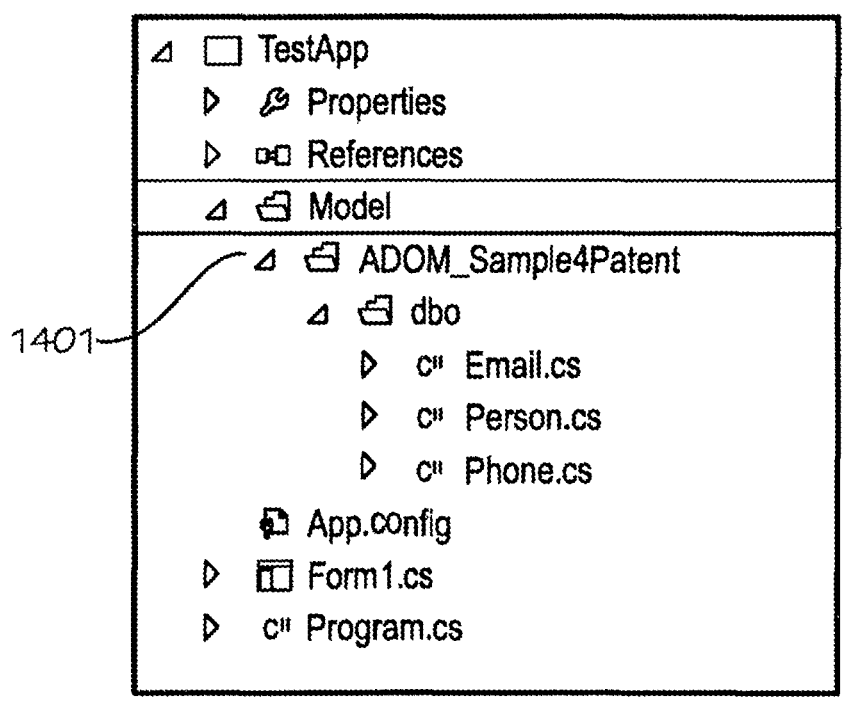
FIG. 16 is a block diagram showing a project file structure used in one embodiment of the present invention.

When generating the class objects, only the top level corresponding attribute XML output needs to be supplied to the Class Builder since any referenced objects are already contained in the hierarchical structure. After selecting the data object for which to build a class, the Class Builder API then examines the solution in Visual Studio and if multiple projects are found, the user is prompted to select the project to which the .NET classes are to be added. The project file structure (FIG. 16) that is generated, mirrors the namespace defined for each of the classes which, as previously stated, is a combination of the schema and database name (1401). This solves the problem of generating classes that may have the same name as other classes which have been (or will be) generated for a different schema or catalog.

Partial sample class structures which were generated from the attached ADOM_Sample4Patent database have been provided in FIGS. 12-14. The Person.cs primary class object output can be seen in FIG. 12. The Email.cs class object output can be seen in FIG. 13, and the Phone.cs class object output can be seen in FIG. 14.

Not only does the Class Builder handle relationships from parent to child, it also generates a place holder reference for each class that serves as a breadcrumb trail back up the structure. For example, the Person table has a reference to Phone, but it may not be directly clear to a developer that Phone ties back to a Person record, or possibly multiple Person records. As seen in FIG. 8, the Phone and Email definitions also contain an empty Person node with the GenerateClass="NO" attribute (609 & 610). If the Class Builder API encounters this node when parsing the XML, it recognizes the GenerateClass attribute and creates an object reference in the class, but does not build another Person class object again, since it was already previously defined at a higher level in the object hierarchy.

There is also a dependency reference to the AdomFramework assembly which is automatically added to the project that was previously selected in the Class Builder API process. This reference contains the definition for the base class that all of the generated data object classes inherit. The AdomFramework assembly also contains a library of Utility methods that assist the developer in serializing and de-serializing the .NET objects to and from XML. The assembly additionally contains other methods which handle merging multiple objects into one, as it is possible the developer is expecting multiple XML responses from the server. This scenario arises when objects are referenced across separate database catalogs.

Database Update Save Process

In a standard relational database management approach there are usually many different queries which must be manually managed in order to save changes to the underlying data. These processes must be manually updated every time there is a change in the data structure, which can be a very tedious task for a DBA or developer. The ADOM framework includes the automated generation of all logic required to save changes to the data. There is a single point of entry stored procedure called the ADOM_spXmlSelector, which takes a single XML parameter that is your updated XML object. This stored procedure is the coordinator for all saves, and is the real workhorse behind the update process. There are two versions of the ADOM_spXmlSelector stored procedure available as options for all saves:

spXmlSelector: This version saves each level of the object individually allowing for the greatest potential of persistence at all levels on the save.

spXmlSelector Trans: This version saves the entire object as a Transaction, which is rolled back if any part of the save fails.

Once the ADOM_spXmlSelector stored procedure has been executed, it interrogates the incoming XML document object parameter to determine contents, and then calls subsequent "Process Changes" stored procedures for each object level which handle inserts, updates, and deletes for the underlying relational database tables.

Concurrency Checking

It is at this point that any concurrency checks required will be performed and automatically logged when found. Each concurrency issue found in the execution batch will be written to a special "ADOM_ConcurrencyIssue" table, and returned to the calling application as described below in the final results set. Once all updates have been processed by the ADOM_spXmlSelector stored procedure, then the primary key of the root node in the XML parameter object is used to re-select the latest version of the object as persisted in the relational tables. Also returned are any concurrency issues found during the save process. There will be a single row for each concurrency issue found which contains the data that was attempted to be saved when the concurrency issue was detected. The resulting returned set of data will then potentially contain two different data sets:

The updated XML object as constructed based on the latest persisted data in the relational database tables.

Any concurrency issues detected during the save process with the data attempted to be saved in its original XML format. This data is used in the application layer to allow the user to decide what is ultimately persisted to the database.

The ADOM framework includes a special set of functionality regarding the concurrency data elements which includes the ADOM_ConcurrencyFormControl and the ADOM_ConcurrencyFormControlType tables. Any data elements in a table which is configured for concurrency checking will be automatically processed into the ADOM_ConcurrencyFormControl table, which includes the following columns:

ConcurrencyFormControlID—Integer based Identity PK column

ConcurrencyFormName—This is the name of the table which contains the data element ConcurrencyFormControlTypeID—This is a FK value to the appropriate ADOM_ConcurrencyFormControlType value. (This is described below)

DisplayText—This is the text which will be displayed to the user in the concurrency UI control which will be defined later in this document. This value defaults to the column name, but can be configured to any text value.

ValueColumn—This is the name of the column from the originating table.

FKTableName—If the ValueColumn is a FK value, then this would be the table name of the lookup or type table referenced.

FKValueColumn—If the ValueColumn is a FK value, then this would be the FK value column name in the FKTableName table.

FKTextColumn—If the ValueColumn is a FK value, then this is an optional column used to identify the appropriate Text column in the FKTableName table. If there are only two columns in the FKTableName table, then this column is not necessary.

OrderBy—This column tells the Concurrency UI control, which will be discussed later, what order to display the concurrency issue results.

The ADOM_ConcurrencyFormControlType table holds a list of UI input form control types to be referenced by the ADOM_ConcurrencyFormControl table. By default, the list of control types below will be automatically added to this table:

Textbox—Any data type can be assigned to this type

Dropdown—Any column that is a FK to a lookup/type table will default to this type Notes—Any text column which would require multi-line display would be assigned to this type Checkbox—Bit columns would default to this type Radio—ADOM does not default any specific data type to this concurrency form control type, but the developer may assign it as desired Datetime—Any datetime column will be defaulted to this type Money—Any money column will default to this type As the ADOM process is adding records to the ADOM_ConcurrencyFormControl table, the data type of the column determines which of these ADOM_Concurrency-FormControlType records to relate to by default. The default values listed above will be auto-assigned by the ADOM process, but these assignments can be overridden by the developer simply by changing the values directly in the table. Any custom control types may also be added to the ADOM_ConcurrencyFormControlType table, such as a custom control formatted for specific data types like phone numbers or SSN.

Primary Key Handling

ADOM has the ability to handle multiple types of Primary Key (PK) definitions including the following data types:

Integer-based Identity columns

Globally Unique Identifier (GUID) columns

Any other data type where the PK value is passed into the XML object

As new records are saved to a table, the ADOM framework automatically handles the generation and persistence of the new PK value to any other hierarchical node levels in the XML parameter document which may use this value in a FK definition. This requires ADOM to intelligently handle the order in which individual node levels (Tables) are processed in order to ensure any required FK values exist at the point of save. The PK values for newly inserted records are then updated throughout the XML parameter object in order to satisfy any FK needs before any child records are written to the database. Since the process of iterating through the object to update any FK values may potentially negatively impact performance on saves of large objects with many new records, the ADOM object structure also includes a special XML node at each table level called "IgnoreIdentityInsert" (303). The developer can tell the save process to ignore the new identity update process for any part of the XML object structure by setting this value to TRUE.

Partial Saves

Figure 9:
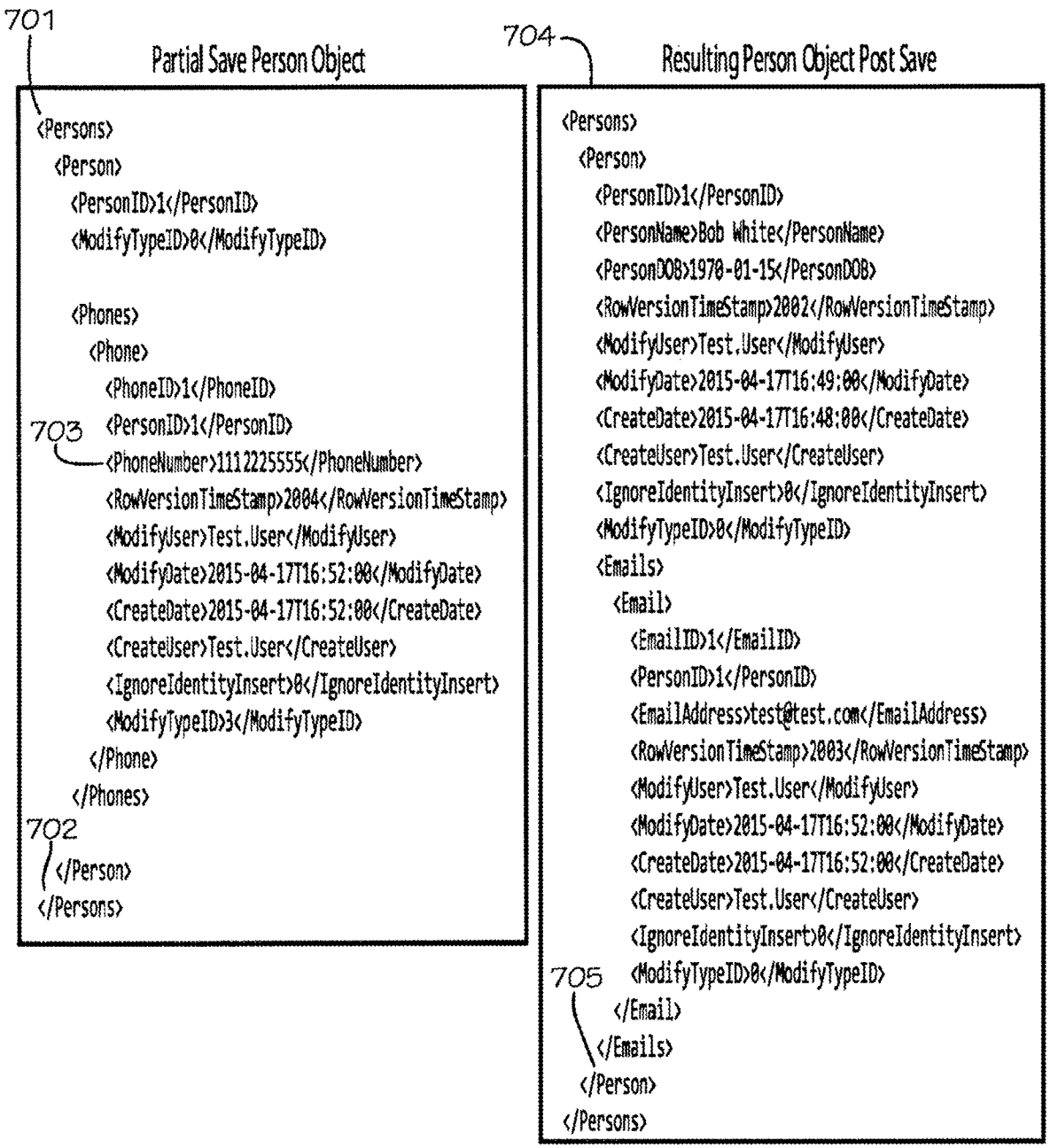
FIG. 9 is printout showing partial save person objects used in one embodiment of the present invention.

By default, the ADOM framework is set up to allow the application to save the entire object structure in a single stored procedure call, which iterates through the XML object and saves each node level individually. This allows the developer the greatest level of abstraction throughout the entire application development life-cycle. However, as the complexity and size of the object grows, the developer may eventually see a performance hit on the save due to the large number of node levels which must be processed. In such cases, the ADOM framework elegantly handles what we call a "Partial Save". This is where the developer can explicitly determine what is sent to the ADOM_spXmlSelector stored procedure and only the modified node levels sent will be processed in the save. The modified nodes are simply wrapped in an "Envelope" root node level (701 & 702) which only contains the PK value for the parent node and a ModifyTypeID node with a value of 0 (no changes). In the example shown in FIG. 9 the Phone record (703) has been set to be deleted (ModifyTypeID=3). This allows the save process to still return the entire updated hierarchical object at the end of the stored procedure (704), thus requiring no modifications to the refresh or concurrency check processes in the UI. In our example, you will notice that the original Person object (301) has changed to the new state of 704, which is missing (705) the deleted phone record with PhoneID=1.

Full Life Cycle

Figure 10:
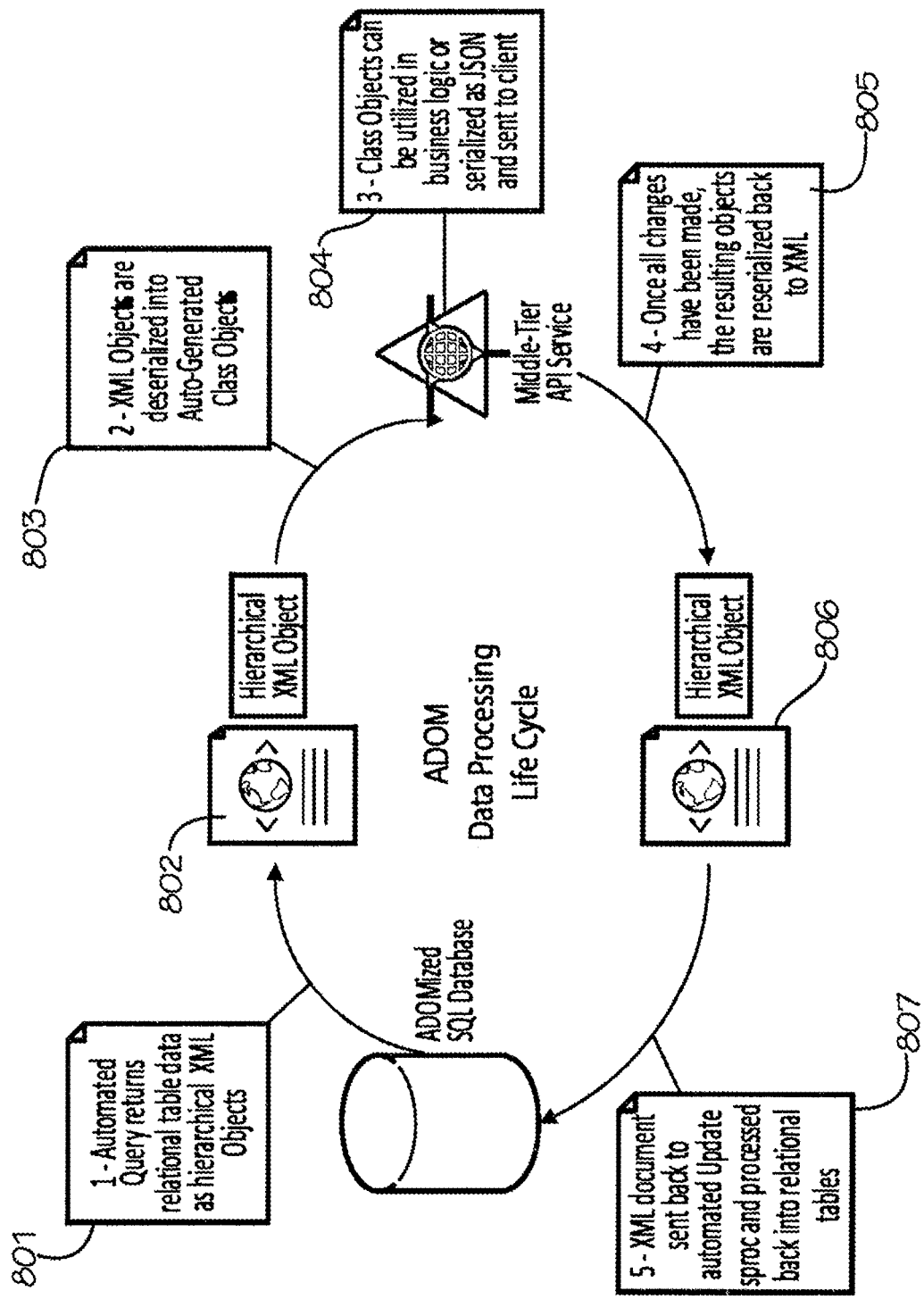
FIG. 10 is a block diagram showing a custom web application development model used with one embodiment of the present invention.

In order to discuss the full life cycle of an application process which utilizes an Adomized database, the custom web application development model represented in FIG. 10 will be used as an example. However, the ADOM framework is open to use with all application platforms.

Select the Objects

The first step in the process would be to select the hierarchical XML object from the database using one of the Generic Search stored procedures which are generated by the ADOM framework (801). Once we have selected the appropriate XML object (802), then we deserialize the XML object directly into the auto-generated middle-tier class object library (803). At this point we serialize the middle-tier class objects into JSON objects (804) using the DataContractJsonSerializer class provided by the Microsoft.NET Framework.

Modify the Objects

The JSON objects are then passed to the calling web components and bound directly to the web UI controls (note: It could be any UI platform at this point). The user interacts with these controls to manage the data (i.e. —Insert/Update/Delete). The UI can also be set up to utilize the JSON object schema for automated field-level validation based on the data type, length, and whether the field is nullable. The data is manipulated by the user through the web UI controls and then once all desired changes have been made, the entire updated JSON object can be passed back to the middle tier and deserialized back into the middle-tier class object library.

Save the Objects

Figure 11:
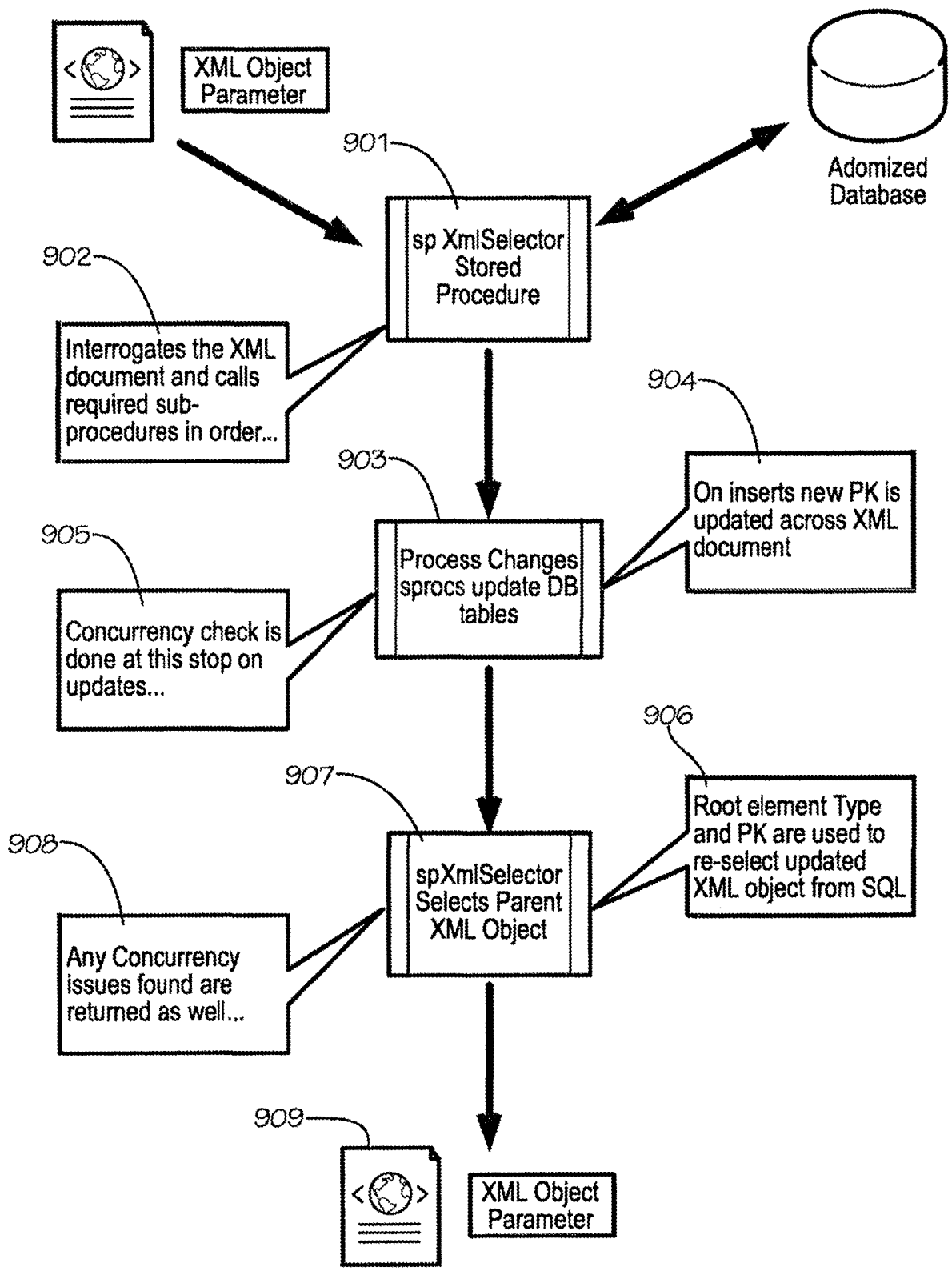
FIG. 11 is a block diagram showing a save process used in one embodiment of the present invention.

The updated class objects are serialized back into XML (805), and the entire XML object (806) is assigned to a single XML parameter in the ADOM_spXmlSelector stored procedure (807), and then the stored procedure is executed. FIG. 11 details the save process as orchestrated by the ADOM_spXmlSelector stored procedure (901). The first step in the save process (902) is to interrogate the XML object structure to determine the root object type, and determine all child object types and the order in which each object level should be processed to ensure all FK values will be present at the appropriate times during the save. Then the appropriate ADOM-generated sub-procedures (903) are called in the correct order passing in the appropriate node level for each.

Each node level is processed based on the ModifyTypeID node value (1=Insert, 2=Update, 3=Delete). On Inserts, if the node level's "IgnoreIdentityInsert" value is FALSE, the new PK value is updated across the XML document in any FK references found (904), in order to ensure that all constraints are met. If IgnoreIdentityInsert is TRUE, then this part of the process is ignored by the stored procedure, which helps to ensure optimal performance during the save process. On Updates, any tables which have been configured for concurrency checking will be evaluated in the sub procedure (905). If a concurrency issue is found, then the data the user was attempting to save is written to the ADOM_ConcurrencyIssue table to be returned at the end of the save process.

Return the Updated Objects

Once all node levels have been processed, the ADOM_spXmlSelector logic determines the PK for the root object (906), and then the root XML object is selected (907) using the appropriate ADOM_GenericSearch* stored procedure. This object will contain the latest state of the hierarchical object data as persisted to the database. Also, if there were any concurrency issues discovered during the save process, then these are also returned (908) along with the updated XML object (909) to the calling process. At this point, the process starts back over at 801, with the exception of the fact that any concurrency issue records found will also be returned to the middle tier.

Handle Concurrency Issues

Any concurrency issues found are displayed to the user based on a combination of the concurrency records returned and the data from the ADOM_ConcurrencyFormControl table. The UI dynamically marries the two of these together to render the concurrency form UI (FIG. 15). This UI allows the user to select whether they want to keep the server version (1302), or override it with their changes (1301). Once the user has iterated through all concurrency issues, then the selected changes are saved (1303) and persisted to the database.

Thus, although there have been described particular embodiments of the present invention of a new and useful SYSTEM FOR MANAGING A RELATIONAL DATABASE USING XML OBJECTS, it is not intended that such references be construed as limitations upon the scope of this invention.

What is claimed is:

1. A computer system including an Automated Database Object Model (ADOM) database having a plurality of ADOM-generated stored procedures, comprising at least one non-transitory computer readable medium, comprising:
   a programming layer; and
   a computer memory including a database layer, wherein the database layer includes
      an information database including a first information table and a second information table, wherein
         the first information table includes a first portion of information, and
         the second information table includes
            a second portion of information, and
            linking information that links the second portion of information to the first portion of information, and
      the plurality of ADOM-generated stored procedures stored, executed, and operated within the database layer and separate from the programming layer, wherein each of the plurality of ADOM-generated stored procedures dictates a corresponding manipulation of the first and second portions of information based on the linking information,
   wherein the database layer is configured to
      receive a request, from the programming layer, for a completed hierarchical data object, the request including an identifier specifying at least one ADOM-generated stored procedure of the plurality of ADOM-generated stored procedures,
      execute, in the database layer, one or more ADOM-generated stored procedures of the plurality of ADOM-generated stored procedures based on the specified at least one ADOM-generated stored procedure, wherein the one or more ADOM-generated stored procedures retrieve the first and second portions of information based on the corresponding dictated manipulations,
      structure, in the database layer using the one or more ADOM-generated stored procedures, the retrieved first and second portions of information into a completed hierarchical data object structure,
      generate, in the database layer using the one or more ADOM-generated stored procedures, the completed hierarchical data object based on the completed hierarchical data object structure, and
      transmit the completed hierarchical data object from the database layer to the programming layer, the completed hierarchical data object including the first and second portions of information, and wherein all mapping of the first and second portions of information to the hierarchical data object is performed by the one or more ADOM-generated stored procedures within the database layer.

2. The system of claim 1, wherein:

the plurality of ADOM-generated stored procedures include

ADOM-generated generic search stored procedures,

ADOM-generated xmlSelector stored procedures,

ADOM-generated process changes stored procedures, and

ADOM-generated delete stored procedures;

the information database includes relational tables and foreign key relationships; and the information database passes entire hierarchical data objects in a single call.

3. The system of claim 2, wherein:

the information database includes an ADOM class builder Application Programming Interface (API);

the information database includes a class object structure that is auto-generated by the ADOM class builder API; and the information database includes a plurality of ADOM-generated class objects built as partial classes.

4. The system of claim 3, wherein:

the information database is a Structured Query Language (SQL) database including relational table data;

the information database returns relational table data as the entire hierarchical data objects in response to automated queries;

the system deserializes the entire hierarchical data objects into auto-generated class objects; and the entire hierarchical data objects include entire hierarchical extensible markup language (XML) objects.

5. The system of claim 4, wherein:

the computer system includes a middle-tier API that serializes the auto-generated class objects as JavaScript Object Notation (JSON) and sends the JSON to a client system;

the computer system reserializes changed JSON received from the client system to create changed hierarchical XML objects; and the relational tables include XML compliant table names and column names, defined foreign key relationships, and defined primary key columns.

6. The system of claim 2, wherein the plurality of ADOM-generated stored procedures include an automated update stored procedure that processes a changed hierarchical data object back into the relational tables included in the information database, wherein the automated update stored procedure:

interrogates the changed hierarchical data object to determine a root object type, a plurality of child object types, and an order for processing the root object type and plurality of child object types, wherein the order for processing is based on an ADOM configuration table, iterates through and processes the each of the root object type and the plurality of child object types in the order for processing by executing at least one of an insert ADOM-generated stored procedure, an update ADOM-generated stored procedure, or a delete ADOM-generated stored procedure to modify the information database based on the changed hierarchical data object, executes the one or more ADOM-generated xmlSelector stored procedures to obtain an updated changed hierarchical data object from the information database, and in response to detecting a concurrency issue while processing each of the root object type and each of the plurality of child object types, returns a notification of the concurrency issue to the programming layer, and continues processing the remaining root object type and plurality of child object types.

7. A computer system including an Automated Database Object Model (ADOM) database having a plurality of ADOM-generated stored procedures, a plurality of ADOM user-defined functions, and a plurality of ADOM tables, comprising at least one non-transitory computer readable medium, comprising:

a programming layer; and a computer memory including a database layer, wherein the database layer includes an information database including a first information table and a second information table, wherein the first information table includes a first portion of information, and the second information table includes a second portion of information, and linking information that links the second portion of information to the first portion of information, and the plurality of ADOM-generated stored procedures stored, executed, and operated within the database layer and separate from the programming layer, wherein each of the plurality of ADOM-generated stored procedures dictates a corresponding manipulation of the first and second portions of information based on the linking information, wherein the database layer is configured to receive a request, from the programming layer, for a completed hierarchical extensible markup language (XML) object, the request including an identifier specifying at least one ADOM-generated stored procedure of plurality of ADOM-generated stored procedures, execute, in the database layer, one or more ADOM-generated stored procedures of the plurality of ADOM-generated stored procedures based on the specified at least one ADOM-generated stored procedure, wherein the one or more ADOM-generated stored procedures retrieve the first and second portions of information based on the corresponding dictated manipulations, structure, in the database layer using the one or more ADOM-generated stored procedures, the retrieved first and second portions of information into a completed hierarchical XML object structure, generate, in the database layer using the one or more ADOM-generated stored procedures, the completed hierarchical XML object based on the completed hierarchical XML object structure, and transmit the completed hierarchical XML object from the database layer to the programming layer, the completed hierarchical XML object including the first and second portions of information, and the plurality of ADOM user-defined functions stored in the database layer;

wherein the plurality of ADOM-generated stored procedures includes a DatabaseUpdateController Structured Query Language (SQL) procedure, a DatabaseFirstRun SQL procedure, an ExecControllerADOM SQL procedure, and a spAddTableColumn SQL procedure.

8. The system of claim 7, wherein the plurality of ADOM user-defined functions includes a fnStringToTable function, a fnCreateAlterProc function, and a SpaceBeforeCap function.

9. The system of claim 7, wherein the information database includes an ADOMFunction table, a DefaultValue table, and a ProcsFunctionstoCopy table.

10. The system of claim 9, wherein the ADOMFunction table includes a CreateRequiredTables script, a LogTableSchemaUpdate script, a LogTableTriggerUpdate script, an UpdateMainSearch script, a CreateAtrributesSelect script, a CreateDeleteProcs script, and a CreateGenericSearch script.

11. The system of claim 10, wherein the CreateRequiredTables script generates an ADOM_Databaselist table, ADOM_MainQuery table, ADOM_ConcurrencyIssue table, ADOM_ForeignKey table, and ADOM_NeverDuplicate table.

12. The system of claim 10, wherein the CreateRequiredTables script generates an ADOM_Configuration table, ADOM_ConcurrencyFormControlType table, ADOM_ConcurrencyFormControl table, and ADOM_ModifyType table.

13. The system of claim 9, wherein the ADOMFunction table includes a CreateProcs script, a CreateProcsGUID script, a CreateProcsidentify script, a CreateProcsNoIdentify script, a CreateSelector script, a CreateSelector_Trans script, and a CreateTableStructure script.

14. The system of claim 9, wherein the ADOMFunction table includes a TablelistInsert script, a ForeignKeyInsert script, a CreateLookUpTableStructure script, a CreateLookupSelect script, a DropExistingAdomProcs script, a ConcurrencyForm script, and an UpdateMainSearchLoop script.

15. A computer system including an Automated Database Object Model (ADOM) database having a plurality of ADOM-generated stored procedures, a plurality of ADOM user-defined functions, and a plurality of ADOM tables, comprising at least one non-transitory computer readable medium, comprising:
    a programming layer; and
    a computer memory including a database layer, wherein the database layer includes
        an information database including a first information table and a second information table, wherein
            the first information table includes a first portion of information, and
            the second information table includes
                a second portion of information, and
                linking information that links the second portion of information to the first portion of information, and
        the plurality of ADOM-generated stored procedures stored, executed, and operated within the database layer and separate from the programming layer, wherein each of the plurality of ADOM-generated stored procedures dictates a corresponding manipulation of the first and second portions of information based on the linking information,
        wherein the database layer is configured to
            receive a request, from the programming layer, for a completed hierarchical extensible markup language (XML) object, the request including an identifier specifying at least one ADOM-generated stored procedure of the plurality of ADOM-generated stored procedures,
            execute, in the database layer, one or more ADOM-generated stored procedures of the plurality of ADOM-generated stored procedures based on the specified at least one ADOM-generated stored procedure, wherein the one or more ADOM-generated stored procedures retrieve the first and second portions of information based on the corresponding dictated manipulations,
            structure, in the database layer using the one or more ADOM-generated stored procedures, the retrieved first and second portions of information into a completed hierarchical XML object structure,
            generate, in the database layer using the one or more ADOM-generated stored procedures, the completed hierarchical XML object based on the completed hierarchical XML object structure, and
            transmit the completed hierarchical XML object from the database layer to the programming layer, the completed hierarchical XML object including the first and second portions of information, and
        the plurality of ADOM user-defined functions stored in the database layer;
    wherein
        the plurality of ADOM-generated stored procedures includes a DatabaseUpdateController Structured Query Language (SQL) procedure, a DatabaseFirstRun SQL procedure, an ExecControllerADOM SQL procedure, and a spAddTableColumn SQL procedure;
        the information database includes an ADOM class builder Application Programming Interface (API);
        the information database includes a class object structure that is auto-generated by the ADOM class builder API; and
        the information database includes a plurality of ADOM-generated class objects built as partial classes.

16. The system of claim 15, wherein the information database includes relational tables having Extensible Markup Language (XML) compliant table names and column names, defined foreign key relationships, and defined primary key columns.

17. The system of claim 16, wherein:
    the information database returns relational table data as entire hierarchical XML objects in response to automated queries; and
    the system deserializes the entire hierarchical XML objects into auto-generated class objects.

18. The system of claim 17, wherein:
    the system includes a middle-tier API that serializes the auto-generated class objects as JavaScript Object Notation (JSON) and sends the JSON to a client system;
    the system reserializes changed JSON received from the client system to create changed hierarchical XML objects; and
    the information database includes an automated update stored procedure that processes the changed hierarchical XML objects back into the relational tables included in the information database.

19. The system of claim 18, wherein:
    the plurality of ADOM user-defined functions includes a fnStringToTable function, a fnCreateAlterProc function, and a SpaceBeforeCap function;

the information database includes an ADOMFunction table, a DefaultValue table, and a ProcsFunctionsto-Copy table;

the ADOMFunction table includes a CreateRequiredTables script; and the CreateRequiredTables script generates an ADOM_Databaselist table, ADOM_MainQuery table, ADOM_ConcurrencyIssue table, ADOM_ForeignKey table, ADOM_NeverDuplicate table, ADOM_Configuration table, ADOM_ConcurrencyFormControlType table, ADOM_ConcurrencyFormControl table, and ADOM_ModifyType table.

20. The system of claim 19, wherein the ADOMFunction table includes a LogTableSchemaUpdate script, a LogTableTriggerUpdate script, an UpdateMainSearch script, a CreateAtrributesSelect script, a CreateDeleteProcs script, a CreateGenericSearch script, a CreateProcs script, a CreateProcsGUID script, a CreateProcsidentify script, a CreateProcsNoIdentify script, a CreateSelector script, a CreateSelector_Trans script, a CreateTableStructure script, a TablelistInsert script, a ForeignKeyInsert script, a CreatelookUpTableStructure script, a CreatelookupSelect script, a DropExistingAdomProcs script, a ConcurrencyForm script, and an UpdateMainSearchloop script.

\* \* \* \* \*